US012269266B2

(12) United States Patent
Yamada et al.

(10) Patent No.: US 12,269,266 B2
(45) Date of Patent: Apr. 8, 2025

(54) NOZZLE PLATE INCLUDING SUBSTRATE ADHESION LAYER BETWEEN BASE LAYER AND SUBSTRATE, AND INKJET HEAD EQUIPPED WITH SAID NOZZLE PLATE

(71) Applicant: Konica Minolta, Inc., Tokyo (JP)

(72) Inventors: Akihisa Yamada, Hino (JP); Ayako Suzuki, Saitama (JP); Hiroaki Kozai, Kodaira (JP); Masahisa Maeda, Hirakata (JP); Nobuyuki Egami, Kumamoto (JP)

(73) Assignee: KONICA MINOLTA, INC., Tokyo (JP)

( * ) Notice: Subject to any disclaimer, the term of this patent is extended or adjusted under 35 U.S.C. 154(b) by 196 days.

(21) Appl. No.: 18/043,008

(22) PCT Filed: Aug. 28, 2020

(86) PCT No.: PCT/JP2020/032515
§ 371 (c)(1),
(2) Date: Feb. 24, 2023

(87) PCT Pub. No.: WO2022/044245
PCT Pub. Date: Mar. 3, 2022

(65) Prior Publication Data

US 2023/0415481 A1 Dec. 28, 2023

(51) Int. Cl.
*B41J 2/14* (2006.01)

(52) U.S. Cl.
CPC .................................. *B41J 2/1433* (2013.01)

(58) Field of Classification Search
CPC ...... B41J 2/1433; B41J 2/1606; B41J 2/1628; B41J 2/1634; B41J 2/1642; B41J 2/1646; B41J 2/162
See application file for complete search history.

(56) References Cited

U.S. PATENT DOCUMENTS

2010/0053269 A1* 3/2010 Fujii .................... B41J 2/1629 347/45
2014/0078220 A1* 3/2014 Sawada ................. B41J 2/1433 347/45

FOREIGN PATENT DOCUMENTS

JP H07-25015 A 1/1995
JP 4088544 B2 5/2008
JP 2010076422 A 4/2010
(Continued)

OTHER PUBLICATIONS

Extended European Search Report dated Aug. 31, 2023, for the corresponding Patent Application No. 20951497.5.
(Continued)

*Primary Examiner* — Bradley W Thies
(74) *Attorney, Agent, or Firm* — LUCAS & MERCANTI, LLP

(57) ABSTRACT

A nozzle plate includes a substrate having thereon at least a base layer and a liquid-repellent layer. A substrate adhesion layer is provided between the substrate and the base layer. A surface portion of the substrate adhesion layer has a higher concentration (atm %) of Cr than a surface portion of the substrate. The base layer is a layer containing at least an inorganic oxide or an oxide containing carbon (C). The liquid-repellent layer is a layer formed by using a coupling agent containing fluorine (F).

11 Claims, 5 Drawing Sheets

(56) References Cited

FOREIGN PATENT DOCUMENTS

| | | | |
|---|---|---|---|
| JP | 2014-054815 | A | 3/2014 |
| JP | 6119152 | B2 | 4/2017 |

OTHER PUBLICATIONS

Japanese Patent Office, Notice of Reasons for Refusal mailed Jan. 23, 2024 for the corresponding Japanese patent application No. 2022-545189, with English translation, 7 pages.

International Search Report for the corresponding patent application No. PCT/JP2020/032515 dated Nov. 10, 2020, with English translation.

International Preliminary Report on Patentability dated Nov. 10, 2020, for the corresponding patent application No. PCT/JP2020/032515, with English translation.

* cited by examiner

NOZZLE PLATE INCLUDING SUBSTRATE ADHESION LAYER BETWEEN BASE LAYER AND SUBSTRATE, AND INKJET HEAD EQUIPPED WITH SAID NOZZLE PLATE

CROSS REFERENCE TO RELATED APPLICATION

This Application is a 371 of PCT/JP2020/032515 filed on Aug. 28, 2020, which is incorporated herein by reference.

TECHNICAL FIELD

The present invention relates to a nozzle plate and an inkjet head. More particularly, it relates to a nozzle plate excellent in adhesion between constituent components, ink resistance and abrasion resistance, and an inkjet head equipped with this nozzle plate.

BACKGROUND ART

An inkjet recording apparatus that is widely used at present holds an inkjet head equipped with a nozzle plate in which a plurality of nozzle holes are arranged in a row by attaching it to a frame. An image is formed on the recording medium by ejecting each color ink in the form of fine droplets from each of the plurality of nozzles toward the recording medium.

As representative methods of ejecting an ink from an inkjet head, there are two methods. One is a method in which water in the ink is vaporized and expanded by the heat generated by passing an electric current through an electrical resistor placed in a pressurizing chamber, and pressure is applied to the ink to eject the ink. The other method is as follows. By making a part of the flow path member constituting the pressure chamber a piezoelectric body, or by installing a piezoelectric body in the flow path member, and selectively driving the piezoelectric body corresponding to the plurality of nozzle holes, a liquid is ejected from a nozzle by deforming a pressurizing chamber based on the dynamic pressure of each piezoelectric body.

In an inkjet head, the surface characteristics of the surface on which nozzles are provided are very important for achieving good ejection performance of ink droplets.

When an ink liquid or a dust adheres to the vicinity of the nozzle holes of the inkjet head, the ejection direction of the ejected ink droplets is bent, or the ejection angle of the ink droplets from the nozzle holes is widened, resulting in the generation of satellites.

In order to stably eject ink droplets, it is necessary to optimize the design of the ink flow path and the method of applying pressure to the ink. However, this alone is not sufficient. It is necessary to maintain a stable surface condition around the hole at all times. To this end, a method of providing a liquid-repellent layer having liquid-repellent properties around the nozzle holes on the ink ejection surface of the nozzle plate to prevent unnecessary ink from adhering to or remaining thereon has been studied.

In general, a silicone compound or a fluorine-containing organic compound such as a silane coupling agent is used for the liquid-repellent layer formed on the nozzle surface of the nozzle plate of the inkjet head.

It is known that a liquid-repellent layer having excellent adhesion may be formed by using a silane coupling agent for forming the liquid-repellent layer. However, when the density of hydroxy groups in the substrate or the base layer that constitutes the nozzle plate is low, the alkaline components that make up the ink will break the existing hydrogen bonds and hydroxy group bonds, and the bonds will be cut. As a result, there is a problem that the liquid-repellent layer has low alkali resistance.

As a method for forming a liquid-repellent layer for the above problem, a method for producing a liquid-repellent layer having high alkali resistance has been disclosed (see, for example, Patent Document 1). This method has the following feature. In the same layer, a silane coupling agent having a reactive functional group at both terminals and a hydrocarbon chain and a benzene ring in the middle portion, a fluorine-containing silane coupling agent, and a silane coupling agent having a fluorocarbon chain at one terminal and a reactive functional group at the other terminal are mixed. Then, by forming a high-density polymer film through a dehydration condensation reaction, hydrophobic benzene rings, alkyl chains, and fluorocarbon chains are present near the siloxane bonds that serve as cross-linking points, as a result, a liquid-repellent layer with high alkali resistance is produced.

However, in the configuration proposed in Patent Document 1, the durability against the alkali component of the ink is still not sufficient, and in the case of using a pigmented ink, a phenomenon has been confirmed in which the surface of the liquid-repellent layer gradually wears down due to abrasion between the wipe material used during maintenance and the pigmented ink containing pigment particles. It has been found that there is a problem that durability (abrasion resistance) cannot be ensured only by maintenance by repeating such operations over a long period of time.

In addition, there is disclosed a nozzle plate in which a nozzle substrate is made of a stainless material, a surface portion in which a concentration of chromium (hereinafter referred to as "Cr") is higher than a concentration of Cr of the stainless material itself on a surface side on which a liquid-repellent layer is formed, a value of a ratio (Cr/Fe) of a concentration (atm %) of Cr to Fe of the surface portion is 0.8 or more, the liquid-repellent layer is a layer containing carbon, and the liquid-repellent layer is directly formed on the stainless material (for example, see Patent Document 2).

According to the invention described in Patent Document 2, the adhesion between the nozzle substrate and the liquid-repellent layer is said to be improved without increasing the manufacturing process.

However, the liquid-repellent layer region is formed by a method of polishing the surface of the nozzle substrate with an abrasive to remove Fe in the surface portion and increase the Cr concentration, and the liquid-repellent layer and the nozzle substrate are in direct contact with each other. In the nozzle plate having such a configuration, when an ink having high interface permeability, for example, an alkaline ink is used over a long period of time, it has been found that the alkali resistance is not sufficient, and in particular, peeling occurs at the interface between the stainless steel substrate and the liquid-repellent layer, for example, inside the nozzle hole in which air and the ink are in contact with each other. In addition, when a pigment ink is used, a phenomenon in which the surface of the liquid-repellent layer is gradually worn due to rubbing between a wiping material used at the time of maintenance and the pigment ink containing pigment particles has been confirmed, and it has been found that there is a problem in that durability (abrasion resistance) cannot be ensured only by maintenance by repeating such an operation over a long period of time.

CITATION LIST

Patent Literatures

Patent Document 1: Japanese Patent No. 4088544
Patent Document 2: Japanese Patent No. 6119152

SUMMARY OF INVENTION

Technical Problem

The present invention was made in view of the above-mentioned problems and circumstances, and the problem to be solved is to provide a nozzle plate excellent in adhesion between constituent members, ink resistance and abrasion resistance, and an inkjet head equipped with the nozzle plate.

Solution to Problem

In view of the above-mentioned problem, the inventor has made a diligent study and found the following. At least a base layer and a liquid-repellent layer are provided on a substrate, and a substrate adhesion layer is provided between the substrate and the base layer, wherein the surface portion of the base adhesion layer has a higher concentration of Cr than the surface portion of the substrate, and the base layer is a layer containing at least an inorganic oxide or an oxide containing carbon (C), and wherein the liquid-repellent layer is a layer formed by using a coupling agent containing fluorine (F). By using this nozzle plate, it is possible to realize a nozzle plate excellent in adhesion between constituent components, ink resistance, and abrasion resistance.

In other words, the above problem related to the present invention is solved by the following means.

1. A nozzle plate comprising a substrate having thereon at least a base layer and a liquid-repellent layer, wherein a substrate adhesion layer is provided between the substrate and the base layer; a surface portion of the substrate adhesion layer has a higher concentration (atm %) of Cr than a surface portion of the substrate; and the base layer is a layer containing at least an inorganic oxide or an oxide containing carbon (C); and the liquid-repellent layer is a layer formed by using a coupling agent containing fluorine (F).

2. The nozzle plate according to item 1, wherein a content rate of trivalent Cr with respect to a total Cr content in the surface portion of the substrate adhesion layer is 50 atm % or more.

3. The nozzle plate according to item 1 or 2, wherein a ratio (Cr/Fe) of a concentration (atm %) of Cr to Fe is 0.8 or more in a concentration (atm %) ratio of constituent elements in the surface portion of the substrate adhesion layer.

4. The nozzle plate according to any one of items 1 to 3, wherein a layer thickness of the substrate adhesion layer is in a range of 1 to 50 nm.

5. The nozzle plate according to any one of items 1 to 4, wherein the base layer contains an oxide composed of at least carbon (C), silicon (Si), and oxygen (O) as the oxide containing carbon (C).

6. The nozzle plate according to any one of items 1 to 5, wherein the base layer is a layer containing a silane coupling agent as the oxide containing carbon (C).

7. The nozzle plate according to item 6, wherein the silane coupling agent contained in the base layer has reactive functional groups at both terminals and contains a hydrocarbon chain and a benzene ring in a middle portion.

8. The nozzle plate according to any one of items 1 to 7, wherein the substrate is stainless steel.

9. An inkjet head equipped with the nozzle plate according to any one of items 1 to 8.

Advantageous Effects of Invention

According to the present invention, it is possible to provide a nozzle plate excellent in adhesion between constituent components, ink resistance and abrasion resistance.

The expression mechanism or action mechanism of the effect of the present invention is inferred as follows.

In the present invention, there is a substrate adhesion layer between the substrate and the base layer, wherein the substrate adhesion layer has a higher concentration (atm %) of Cr than the substrate, the base layer is a layer containing at least an inorganic oxide or an oxide containing carbon (C), and the liquid-repellent layer is a layer formed using a coupling agent containing fluorine (F).

FIG. 1 shows an example of a configuration of nozzle holes constituting a conventional nozzle plate.

A nozzle plate 1 shown in FIG. 1 has a configuration in which a base layer 4 and a liquid-repellent layer 5 as an outermost layer are provided on a substrate 2. A nozzle hole N is formed to penetrate the nozzle plate 1 having such a configuration. When an ink In is filled in the nozzle hole N and, for example, when the ink In is an alkaline ink, it has been found that the ink In present on the inner surface of the nozzle hole particularly erodes the interface between the substrate 2 and the base layer 4 to cause a problem of peeling at the interface. Thus, the durability (ink resistance) of the nozzle plate is greatly deteriorated.

In the course of diligently studying the above problem, the inventor has found the following. As shown in FIG. 2, by providing a substrate adhesion layer 3 containing Cr as a main component between a substrate 2 and a base layer 4 containing at least an inorganic oxide or a carbon-containing oxide, it is possible to prevent ink from penetrating into the interface between the substrate and the base layer and to prevent peeling between the substrate and the base layer even when printing with an alkaline ink is performed for a long period of time. In addition, when the content rate of trivalent Cr with respect to the total Cr content in the surface portion of the substrate adhesion layer is 50 atm % or more, the abrasion resistance may be significantly improved.

Furthermore, it has been found that the alkali ink resistance can be improved by setting the ratio (Cr/Fe) of the concentration (atm %) of Cr to Fe to 0.8 or more as the concentration ratio (atm % ratio) of constituent elements in the surface portion of the substrate adhesion layer.

In addition, the base layer constituting the nozzle plate is a layer containing an oxide, preferably, the base layer contains at least an inorganic oxide or an oxide containing carbon (C), more preferably, it contains a silane coupling agent. Still more preferably, the silane coupling agent having reactive functional groups at both terminals and containing a hydrocarbon chain and a benzene ring in the middle portion is densely polymerized and creates a stacking interaction with each other, so that when the nozzle plate is subjected to stress, especially in the thickness direction, the adhesion between the substrate of the nozzle plate and the constituent component layers provided on the substrate may be improved, and the resistance of the nozzle plate surface to stress in the width direction due to wiping materials used for maintenance may be improved along with the improvement of the adhesion. In addition, by providing a base layer including an intermediate layer, the coupling agent in the liquid-repellent layer may be efficiently oriented on the surface and densely packed on the flat surface, thereby realizing excellent liquid-repellency and ensuring durability against alkali and long-term repeated maintenance using pigment inks.

DESCRIPTION OF EMBODIMENTS

Figure 1:
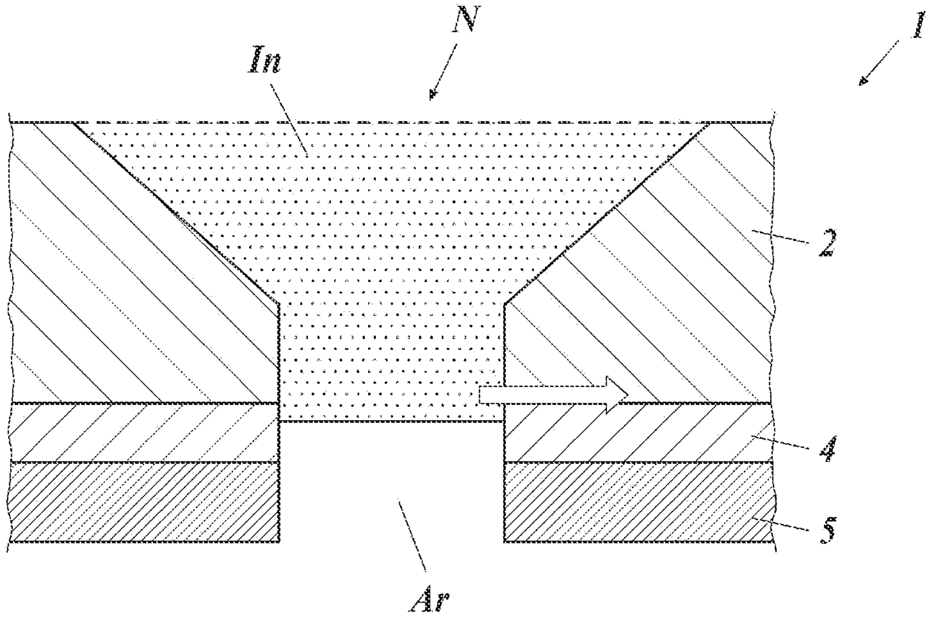
FIG. 1 This is a schematic cross-sectional view showing an example of a configuration of a nozzle hole portion of a nozzle plate of a comparative example.

The nozzle plate of the present invention is a nozzle plate having, on a substrate, at least a base layer and a liquid-repellent layer, wherein a substrate adhesion layer is provided between the substrate and the base layer, the surface portion of the substrate adhesion layer has a higher concentration (atm %) of Cr than the surface portion of the substrate, the base layer is a layer containing at least an inorganic oxide or an oxide containing carbon (C), and the liquid-repellent layer is a layer formed using a coupling agent containing fluorine (F). This feature is a technical feature common to the invention for each of the following embodiments.

As an embodiment of the present invention, it is preferable that the content rate of trivalent Cr (Cr (III)) with respect to the total Cr content in the surface portion of the substrate adhesion layer is 50 atm % or more from the viewpoint of further improving the abrasion resistance which is the object effect of the present invention.

In addition, it is preferable that the ratio (Cr/Fe) of the concentration (atm %) of Cr to Fe is 0.8 or more in the concentration (atm %) ratio of the constituent elements in the surface portion of the substrate adhesion layer, because even when printing with an alkaline ink is performed for a long period of time, penetration of the ink into the interface between the substrate and the base layer may be prevented, and peeling between the substrate and the base layer may be further prevented.

In addition, it is preferable that the layer thickness of the substrate adhesion layer is in the range of 1 to 50 nm from the viewpoint that it is possible to further improve the alkali ink resistance in the nozzle hole inner surface portion of the nozzle plate which is an object effect of the present invention.

In addition, it is preferable that the base layer contains an oxide composed of at least carbon (C), silicon (Si), and oxygen (O) as an oxide containing carbon (C) from the viewpoint of exhibiting the effect of holding the coupling agent containing fluorine (F) contained in the liquid-repellent layer as the upper layer and further improving the adhesion between the liquid-repellent layer and the intermediate layer.

In addition, the fact that the base layer is a layer containing a silane coupling agent, and further that the silane coupling agent has reactive functional groups at both terminals and contains a hydrocarbon chain and a benzene ring in a middle portion, improves adhesion with the substrate, especially a metal base material, and improves adhesion between the substrate of the nozzle plate and the constituent component layer thereon when the nozzle plate is stressed, especially in the thickness direction. In addition to improving adhesion, the surface of the nozzle plate may be improved in abrasion resistance when stress is applied in the width direction by a wipe material used during maintenance.

It is also preferred that the substrate is stainless steel because more excellent durability may be exhibited.

Hereinafter, the present invention, constituent components thereof, and modes and embodiments for carrying out the present invention will be described in detail. In the present application, "to" representing a numerical range is used to mean that numerical values described before and after the "to" are included as a lower limit value and an upper limit value.

<<Nozzle Plate>>

The nozzle plate of the present invention is a nozzle plate having, on a substrate, at least a base layer and a liquid-repellent layer, and having a substrate adhesion layer between the substrate and the base layer, wherein a surface portion of the substrate adhesion layer has a higher Cr concentration (atm %) than a surface portion of the substrate, the substrate adhesion layer contains at least an inorganic oxide or an oxide containing carbon (C), and the liquid-repellent layer is formed using a coupling agent containing fluorine (F).

Hereinafter, the nozzle plate of the present invention will be described in detail.

[Basic Configuration of Nozzle Plate]

First, a basic configuration of a nozzle plate according to an embodiment of the present invention will be described with reference to the drawings. In the explanation of each figure, the numbers at the end of the components represent the codes in each figure.

Figure 3:
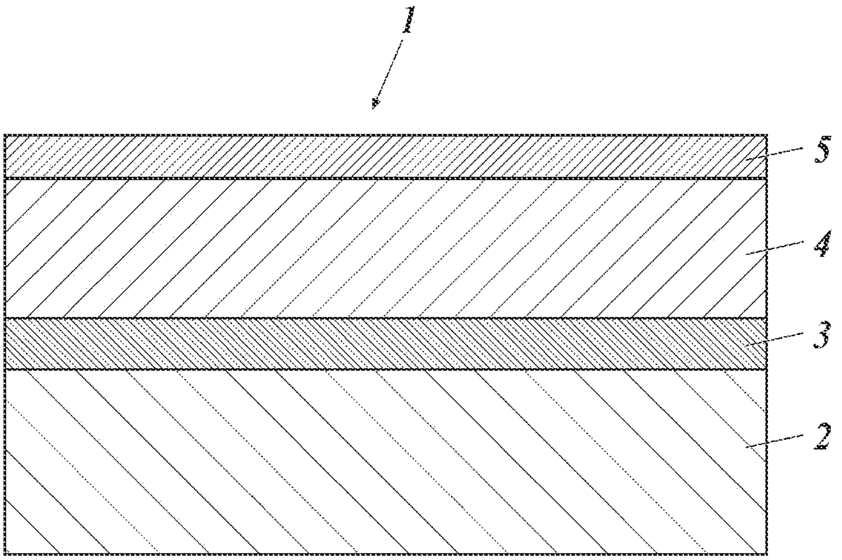
FIG. 3 This is a schematic cross-sectional view showing an example of a configuration of a nozzle plate of the present invention.

FIG. 3 is a schematic cross-sectional view of a nozzle plate having the configuration specified in the present invention.

As shown in FIG. 3, the basic configuration of the nozzle plate 1 of the present invention is a configuration in which a substrate adhesion layer 3 having a higher Cr concentration (atm %) than that of a substrate is formed on the substrate 2, a base layer 4 containing at least an inorganic oxide or an oxide containing carbon (C) is formed on the substrate adhesion layer 3, and a liquid-repellent layer 5 having a coupling agent containing fluorine (F) is formed on a top surface layer.

Figure 4:
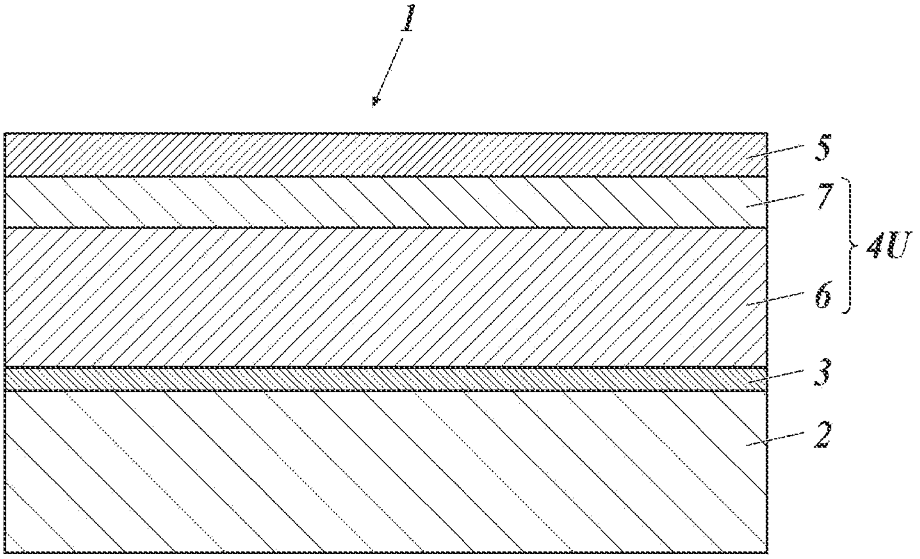
FIG. 4 This is a schematic cross-sectional view showing another example of the configuration of the nozzle plate of the present invention.

FIG. 4 is a schematic cross-sectional view showing an example of another configuration of the nozzle plate according to the present invention.

The nozzle plate 1 shown in FIG. 4 has a configuration in which the base layer 4 to be provided between the substrate adhesion layer 3 and the liquid-repellent layer 5 in the configuration of the nozzle plate shown in FIG. 3 is made to be a base layer unit 4U composed of two layers of a first base layer 6 and a second base layer 7. For example, the first base layer 6 may be configured to contain a silane coupling agent (hereinafter also referred to as a silane coupling agent A) having reactive functional groups at both terminals and containing a hydrocarbon chain and a benzene ring in a middle portion, and the second base layer 7 may be configured to contain an organic oxide containing silicon (Si), for example, a low-molecular-weight silane compound or a silane coupling agent.

[Constituent Materials of Nozzle Plate]

Next, details of the substrate 2, the substrate adhesion layer 3, the base layer 4, and the liquid-repellent layer 5, constituting the nozzle plate of the present invention will be described.

The present invention is characterized in that a substrate adhesion layer is provided between a substrate and a base layer, a surface portion of the substrate adhesion layer has a higher Cr concentration (atm %) than a surface portion of the substrate, the base layer is a layer containing at least an inorganic oxide or an oxide containing carbon (C), and the liquid-repellent layer is a layer formed using a coupling agent containing fluorine (F).

The surface portion of the substrate in the present invention refers to an area to a depth of 5 nm from the top surface on the surface side in contact with the substrate adhesion layer. The surface portion of the substrate adhesion layer is the opposite side of the surface side in contact with the substrate, and the surface portion generally refers to an area from the top surface of the substrate adhesion layer to a depth of 5 nm in the direction of the substrate.

[Substrate]

The substrate 2 that constitutes the nozzle plate 1 may be selected from materials having high mechanical strength, ink resistance, and excellent dimensional stability, and for example, various materials such as inorganic materials, metal materials, and resin films may be used. Among them, inorganic materials and metal materials are preferred, and metal materials such as iron (e.g., stainless steel (SUS)), aluminum, nickel, and stainless steel are especially preferred. Especially preferred is stainless steel (SUS).

The thickness of the substrate that constitutes the nozzle plate is not particularly limited, and it is in the range of 10 to 500 μm, preferably in the range of 30 to 150 μm.

[Substrate Adhesion Layer]

(Configuration of Substrate Adhesion Layer)

In the present invention, the surface portion of the substrate adhesion layer according to the present invention, which is formed between the substrate and the base layer to be described later, is characterized by a higher Cr concentration than the surface portion of the substrate.

In the nozzle plate of the present invention, it is preferable to apply stainless steel (SUS) as the substrate as described above, for example, in the case where surface treatment is not performed at all, the composition of the SUS304 which is typical stainless steel is 71 atm % of Fe, 18 atm % of Cr, 8.5 atm % of Ni, and the remainder is other elements. However, on the surface of the stainless steel substrate in contact with air, there are elements of carbon and oxygen due to oxidation by air and adsorption of extremely small amounts of organic matter, which will be described later. An elemental analysis by XPS shows that the elemental composition is, as an example, C: 31 atm %, 0: 47 atm %, Cr: 9.8 atm %, Fe 7.5 atm %, and others. When SUS304 is used as the substrate, the amount of Cr in the surface of SUS304 is 9.8 atm %.

The substrate adhesion layer according to the present invention contains at least Cr, and the content of Cr is preferably such that the content rate of trivalent Cr to the total Cr content in the substrate adhesion layer is 50 atm % or more. This is one of the preferable embodiments.

As mentioned above, the surface portion of the substrate adhesion layer is the opposite side of the surface side in contact with the substrate, and the surface portion generally refers to an area from the top surface of the substrate adhesion layer to a depth of 5 nm in the direction of the substrate.

In the substrate adhesion layer according to the present invention, as the atomic concentration ratio (atm % ratio) of the constituent elements in the surface portion specified above, the value of the ratio (Cr/Fe) of the concentration (atm %) of Cr to Fe is preferably 0.8 or more.

(Specific composition analysis method of substrate adhesion layer)

Hereinafter, each characteristic value of the substrate adhesion layer according to the present invention and a specific measurement method thereof will be described in detail.

<Measurement of Composition Ratio of Constituent Elements of Substrate Adhesion Layer>

In the present invention, the method of measuring the composition ratio of the elements constituting the substrate adhesion layer is not particularly limited, but in the present invention, examples of the methods include: a method of quantitatively analyzing the composition of the material that constitutes the sliced portion by scraping an area of 10 nm from the surface of the substrate adhesion layer using a glass knife for trimming; a method of quantifying the mass of the compound in the thickness direction of the substrate adhesion layer using a method such as scanning with infrared spectroscopy (IR) or atomic absorption. Even if the substrate adhesion layer is an ultrathin film of 10 nm or less, it can be quantified by XPS (X-ray Photoelectron Spectroscopy) analysis method. Among these methods, the XPS analysis method is preferred because it enables elemental analysis even for an ultrathin film and also because it enables measurement of the composition distribution profile in the layer thickness direction of the entire substrate adhesion layer by the depth profile measurement described below. This is a preferred method. A detailed description of the X-ray photoelectron spectroscopy (XPS analysis method) is described below.

(Analysis Method 1: Measurement of Trivalent Cr Content Rate in the Surface Portion of the Substrate Adhesion Layer)

The method for measuring a trivalent Cr content rate in the surface of the substrate adhesion layer is described below.

In the substrate adhesion layer according to the present invention, the trivalent Cr content rate relative to the total Cr content in the surface portion is preferably 50 atm % or more, and the trivalent Cr content rate may be determined according to the method described below.

In the present invention, for Cr in the surface portion of the substrate adhesion layer having zerovalence (elemental metal, Cr (0)), trivalence (Cr (III), for example, $Cr_2O_3$), and hexavalence (Cr (VI), for example $CrO_3$), it is preferable to use an X-ray photoelectron spectroscopic analysis method in order to measure the content rate by valence.

X-ray photoelectron spectroscopy (XPS) is a type of analytical method that is called as XPS (X-ray Photoelectron Spectroscopy), or ESCA (Electron Spectroscopy by Electron Spectroscopy for Chemical Analysis). It is a method for analyzing the constituent elements and their electronic states that exist in the surface of a sample from the surface to a depth of 5 nm.

The following is an example of specific conditions of XPS analysis applicable to the present invention.

Analyzer: QUANTERA SXM by ULVAC-PHI Inc.

X-ray source: Monochromatized Al-Kα 15 kV 25 W

Pass energy: 55 eV

Data processing: MultiPak by ULVAC-PHI Inc.

Elemental composition analysis: The background processing is performed using a Shirley method, and the elemental composition is quantified from the obtained peak area using the relative sensitivity coefficient.

Cr valence state analysis: After correcting for peak shift due to charging from the binding energy of the carbon is peak, peak separation is performed for the Cr 2p3/2 peak, and then peak separation is performed for the zerovalent Cr, trivalent Cr, and hexavalent Cr peaks. The binding energies of each state are 574.3 eV for zerovalent Cr, 576.0 eV for trivalent Cr, 578.9 eV for hexavalent Cr. With this value as the peak, fitting is performed under the condition that the FWHM (full width at half maximum) of the peak is within the range of 1.2 to 2.8, and the ratios of zerovalent, trivalent and hexavalent chromium are calculated from the area ratio of each peak.

The above is a method to determine the trivalent chromium content in the surface (5 nm depth) of a sample without a base layer or liquid-repellent layer. However, it is possible to determine the trivalent Cr content rate in the surface of the substrate adhesion layer by performing the above measurement on a sample with a base layer or liquid-repellent layer after removing the base layer or liquid-repellent layer using GCIB (Gas Cluster Ion Beam).

By using the above-described X-ray photoelectron spectroscopic analysis method, for example, the content rate of Cr for each valence of a nozzle plate in which a substrate adhesion layer is formed on a substrate by performing Cr sputtering and plasma treatment is measured, and the content rate of trivalent Cr with respect to the total Cr content may be obtained.

Figure 5:
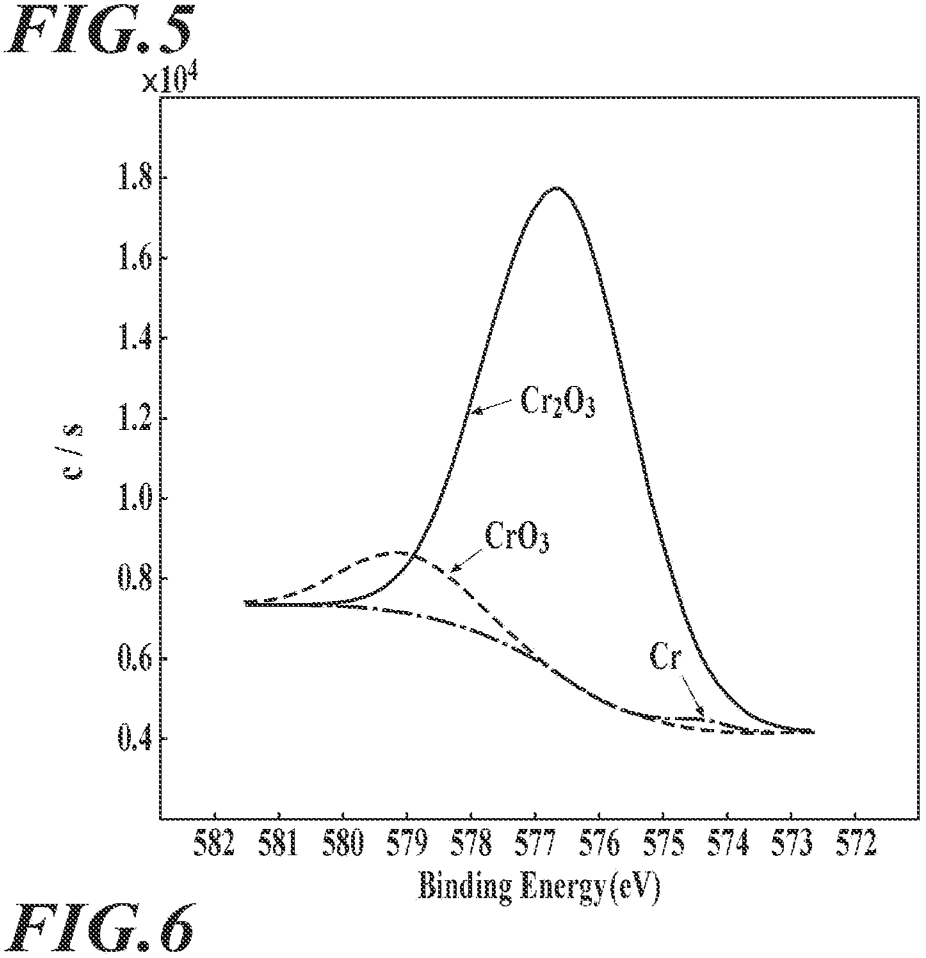
FIG. 5 This is a graph showing an example of a profile for each valence of Cr in the substrate adhesion layer.

An example of profiles by valence of Cr in the substrate adhesion layer measured by the above method is shown in FIG. 5.

<Analysis Method 2: Measurement of the Average Composition Ratio of Each Element in the Substrate Adhesion Layer>

In the present invention, the average composition ratio of each element in the surface of the substrate adhesion layer is calculated together with the content rate of trivalent Cr to the total Cr content. The average composition ratio is obtained by randomly measuring 10 samples and using the average value to obtain the composition ratio (atm %) of each element, and calculate the ratio of the concentration of Cr to Fe.

The analysis method 2 is the same as the elemental composition analysis described in the above analysis method 1, but since the valence state analysis is not required, "Pass energy" is not specified. For a sample with a base layer or liquid-repellent layer, the above measurement may be performed after removing the base layer or liquid-repellent layer using GCIB (Gas Cluster Ion Beam) in the same manner as the analysis method 1.

<Analysis Method 3: Measurement of Atomic Concentration Distribution in Layer Thickness Direction>

In the present invention, the atomic concentration distribution curve in the direction of the thickness of the substrate from the substrate adhesion layer (hereinafter referred to as "depth profile") is measured by measuring the concentration of metal oxides or nitrides (atm %), silicon oxides or nitrides (atm %), carbon (C), nitrogen (N), oxygen (O), argon (Ar), fluorine (F), silicon (Si), chromium (Cr), iron (Fe), and nickel (Ni) by combining the measurement of X-ray photoelectron spectroscopy and ion sputtering with rare gases. It may be measured by sequentially analyzing the surface composition of the surface portion of the substrate adhesion layer and the surface portion of the substrate while exposing from the surface portion of the substrate adhesion layer toward the substrate surface side.

The distribution curve obtained by such XPS depth profile measurement may be prepared, for example, with the vertical axis as the concentration of each element (unit: atm %) and the horizontal axis as the etching time (sputtering time). In the atomic concentration distribution curve where the horizontal axis is the etching time, since the etching time is generally correlated with the distance from the surface of the substrate adhesion layer in the layer thickness direction, the "distance from the surface of the substrate adhesion layer in the thickness direction of the substrate adhesion layer" is used for XPS depth profile measurement. It may be adopted as the distance from the surface of the substrate adhesion layer calculated from the relationship between the etching rate and the etching time employed in the actual application. In addition, as the sputtering method employed in such XPS depth profile measurement, a rare gas ion sputtering method using argon (Ar) as the etching ion species may be employed. The etching speed (etching rate) may be measured using the $SiO_2$ thermal oxide film whose thickness is known in advance. The etching depth is often expressed in terms of $SiO_2$ thermal oxide film equivalent.

The following is an example of specific conditions of XPS analysis applicable to composition analysis of the surface area of the substrate adhesion layer for the present invention.

Analyzer: QUANTERA SXM by ULVAC-PHI Inc.

X-ray source: Monochromatized Al-Kα 15 kV 25 W

Sputtering ion: Ar (1 keV)

Depth profile: The depth profile in the depth direction is obtained by repeating the measurement at a specified thickness interval with the $SiO_2$ equivalent sputter thickness. The thickness interval was set to 2.6 nm (data was obtained every 2.6 nm in the depth direction).

Quantification: The background was determined by a Shirley method, and quantification was performed from the obtained peak area using the relative sensitivity coefficient method. Data processing was performed using MultiPak by UL VAC-PHI Inc.

Figure 6:
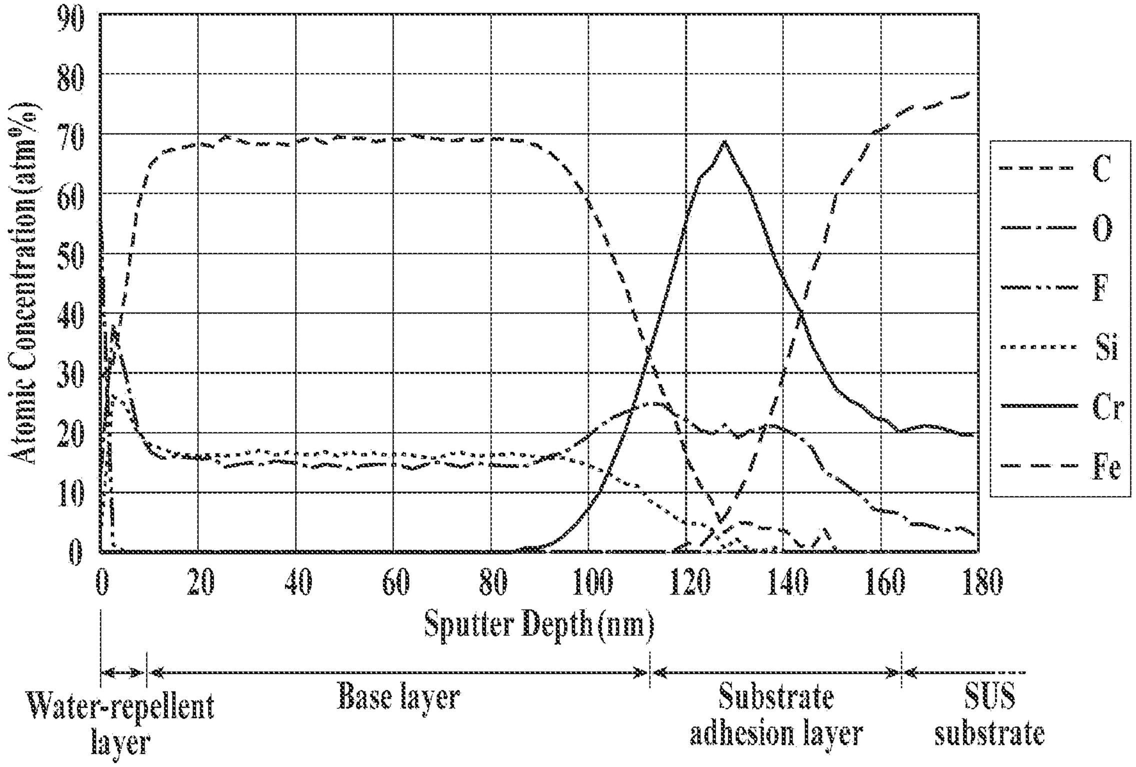
FIG. 6 This is a graph showing an example of each atom concentration distribution curve (depth profile) in the thickness direction of the substrate and the substrate adhesion layer.

An example of the measurement results is shown below. FIG. 6 shows an example of each atom concentration distribution curve (depth profile) measured by XPS for a nozzle plate composed of: substrate/substrate adhesion layer/base layer/liquid-repellent layer.

The atomic concentration distribution curve (depth profile) shown in FIG. 6 shows an example of a substrate adhesion layer formed by direct plasma treatment on the surface of a SUS substrate by the plasma etching method described below. It shows that the Cr concentration on the surface of the substrate adhesion layer is higher than the Cr concentration in the surface of the substrate.

The point where the concentration of C derived from the base layer becomes 1/2 of the peak concentration among the constituent atoms of the substrate from the liquid-repellent layer may be ascertained as the surface portion of the substrate adhesion layer (interface between the base layer and the substrate adhesion layer). In other words, the location at which the etching time is 88 (min) and the distance is approximately 113 nm from the surface of the water-repellent layer may be considered as the interface between the base layer and the substrate adhesion layer.

On the other hand, the point where the concentration of Cr becomes flat may be understood as the surface of the substrate adhesion layer (interface between the base layer and the substrate adhesion layer). In other words, here, the etching time is 128 (min), and the location about 164 nm from the surface of the water-repellent layer may be considered as the interface between the base material adhesion layer and the substrate. It can be seen that there is a layer where the concentration of Cr in the surface of the substrate adhesion layer is larger than the concentration of Cr in the surface of the substrate.

(Method of Forming the Substrate Adhesion Layer)

The method for forming the substrate adhesion layer according to the present invention is not particularly limited, but the following method may be applied.

Film forming methods applicable to the present invention include thy film forming methods such as physical vapor deposition (PVD) and chemical vapor deposition (CVD) and wet film forming methods such as electrolytic plating and electroless plating. However, in the present invention, it is preferable to form the film by the dry film forming method because a thin and dense film may be formed.

In the present invention, examples of the dry film forming method include sputtering, vacuum evaporation, laser ablation, ion plating, electron beam epitaxy (MBE method), metal organic vapor deposition (MOCVD method), plasma CVD method, plasma etching method using oxygen gas ($O_2$PE mode), and reactive ion etching method using oxygen gas ($O_2$RIE mode). However, from the viewpoint of being able to form a thin, dense film with a high concentration of Cr, a sputtering method or a plasma etching mode method ($O_2$PE mode) using oxygen gas is preferable.

In the present invention, among the above described methods, the method of surface treatment by plasma treatment after film formation by the sputtering method is preferred in that the desired substrate adhesion layer may be formed.

(Specific Film Forming Method of the Substrate Adhesion Layer)

The following two methods are typical methods of forming the substrate adhesion layer.

1. Film forming method 1: A plasma treatment as described below is performed on a substrate to form a substrate adhesion layer.

2. Film forming method 2: A Cr layer (Cr 100 atm %) is formed on a substrate by a sputtering method using Cr as a target, and then the Cr layer is subjected to a plasma treatment described later to form a substrate adhesion layer.

(1) Formation of substrate adhesion layer by Cr sputtering

In the sputtering method, a substrate adhesion layer is formed by sputtering a Cr target under an atmosphere of argon gas, oxygen gas, or methane. The Cr content in the substrate adhesion layer deposited by this sputtering method is almost 100 atm %.

An example of a film forming method by a specific sputtering method is shown below.

Under vacuum conditions, a pre-set Cr target was sputtered on the electrode of a DC sputter deposition apparatus under the following conditions. In this case, not only DC sputtering but also other plasma sources may be used.

Target: Cr
DC power density: 1.1 W/$cm^2$
Power: RF power (13.56 MHz), 200 W
Temperature: 2.5° C.
Pressure: 0.3 Pa
Introduced gas: Argon gas
Deposition time: 30 sec.

The layer thickness of the substrate adhesion layer deposited by the above sputtering method is 20 nm. As for the layer thickness of the substrate adhesion layer for the present invention, the layer thickness of the substrate adhesion layer is generally in the range of 1 to 5000 nm, and it is preferable that the layer thickness of the substrate adhesion layer is in the range of 1 to 100 nm. From the viewpoint of alkali resistance of the nozzle plate and processability during nozzle hole fabrication, it is further preferred to be in the range of 5 to 50 nm.

(2) Plasma treatment after Cr sputtering

As the plasma etching modes applicable to the present invention, an RIE mode and a PE mode may be mentioned. The "RIB" (Reactive Ion Etching) mode in the present invention refers to a method of arranging a substrate constituting a nozzle plate, such as SUS304, as an object to be plasma-treated on the side of the feeding electrode in a pair of opposing flat electrodes, and plasma treatment is performed on the surface of the object to be plasma-treated. On the other hand, the "PE" (Plasma Etching) mode is a method in which an object to be plasma-treated is arranged on the ground electrode side of a pair of opposing flat plate electrodes, and plasma treatment is performed on the surface of the object to be plasma-treated.

The details of each plasma etching mode are further explained with figures.

<RIE Mode Plasma Treatment Apparatus>

Figure 7:
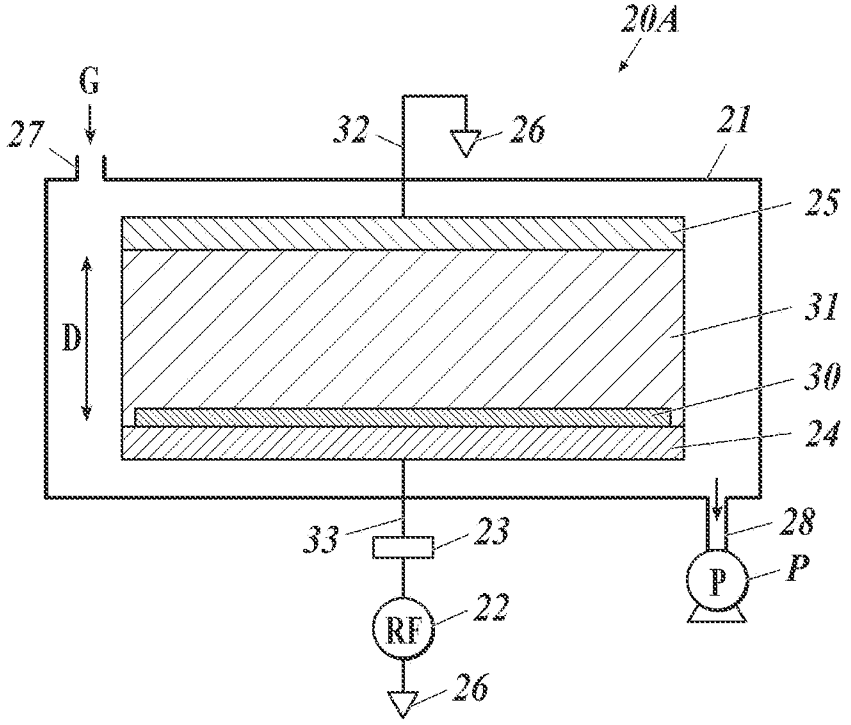
FIG. 7 This is a schematic view showing an example of an RIE mode high-frequency plasma apparatus used for forming a substrate adhesion layer.

FIG. 7 is a schematic view showing an example of an RIE mode high-frequency plasma apparatus (reactive ion etching mode) used for forming a substrate adhesion layer. The RIE mode is suitable for physical and high-speed surface treatment by ion bombardment.

In FIG. 7, an RIE mode high-frequency plasma apparatus 20A (hereinafter, it may be referred to as a "plasma treatment apparatus 20A") is composed of a reaction chamber 21, a high-frequency power supply 22 (RF (radio frequency) power supply), a capacitor 23, a flat electrode 24 (cathode, also referred to as a "feeding electrode"), a counter electrode 25 (anode, also referred to as a "ground electrode"), and a ground 26. The reaction chamber 21 has a gas inlet 27 and outlet 28. The flat electrode 24 and the counter electrode 25 are disposed within the reaction chamber 21.

A pair of electrodes composed of a flat electrode 24 connected to a high-frequency power supply 22 via a capacitor 23 and a counter electrode 25 opposed to the flat electrode 24 and grounded by a ground part 26 is arranged in a sealable reaction chamber 21. A nozzle plate substrate 30 as an object to be plasma-treated is arranged on the flat electrode 24.

First, air is sufficiently removed from the reaction chamber 21 via the gas outlet 28. In this state, while supplying the reaction gas G (such as Ar, $O_2$) is supplied to the reaction chamber 21 via the gas inlet 27, while the high-frequency power supply 22 is started, and the high-frequency power supply 22 is charged with a 3 MHz or higher and 100 MHz or lower (typically, 13.56 MHz). When power is supplied, a discharge D is generated between the flat electrode 24 and the counter electrode 25 to form a discharge space 31 in which low temperature plasma (cations and electrons) and radical species of the reaction gas G are generated. At this time, the high-frequency power density is preferably set in the range of 0.01 to 3 W/cm.

In the above configuration, due to the difference in mobility between ions and electrons, electrons are collected on the flat electrode 24 and charge the flat electrode 24 relatively negatively (self-bias). The electrons of the flat electrode 24 stop at the capacitor 23 via the feed line 33. The electrons of the counter electrode 25 flow to ground 26 via feed line 32.

On the other hand, radical species and cations are not easily collected by the electrodes and move in the plasma. When the nozzle plate substrate 30 as an object to be treated is placed on the flat electrode 24 in this plasma, an ion sheath in which a strong electric field is generated on the electrode 25 side of the nozzle plate substrate 30 is produced, and an electric field of 400 to 1000 V is generated, and cations moving in the nozzle plate substrate 30 collide or contact the nozzle plate substrate 30. Thus, surface treatment (in this case etching) of the object to be treated is performed.

The reaction gas G used for etching includes rare gases (e.g., helium gas, neon gas, argon gas, krypton gas, and xenon gas), oxygen gas, and hydrogen gas, but in the present invention, argon gas is used as the reaction gas G. The RIE mode plasma treatment method is called "Ar-RIE mode plasma treatment" and the RIE mode plasma treatment method using oxygen gas as the reaction gas is referred to as "$O_2$-RIE mode plasma treatment".

<PE Mode Plasma Treatment Apparatus>

Figure 8:
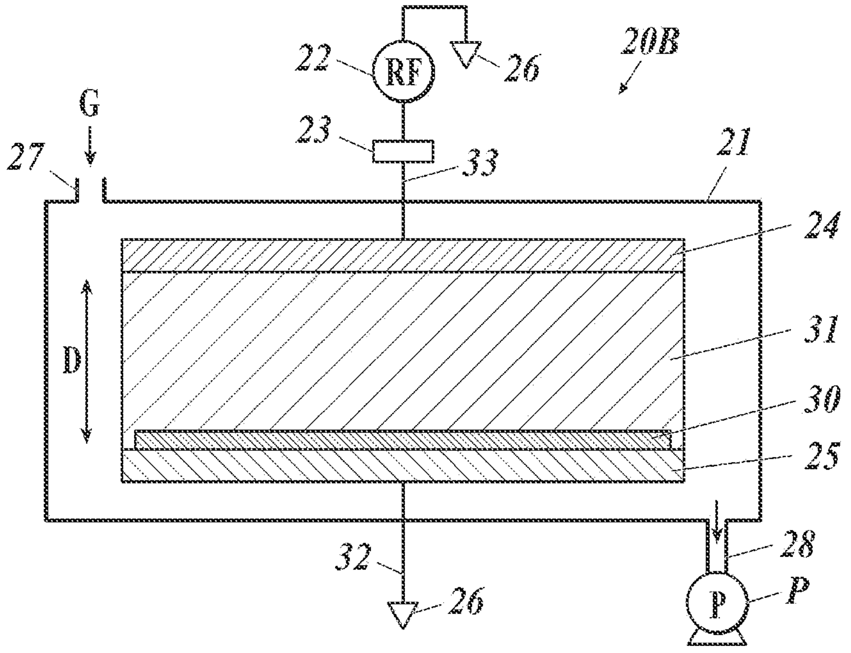
FIG. 8 This is a schematic view showing an example of a PE mode high-frequency plasma apparatus used for forming a substrate adhesion layer.

FIG. 8 shows a schematic view of a PE mode (plasma etching mode) high-frequency plasma apparatus used to form the substrate adhesion layer. The PE mode enables mild treatment with less ion collision effect.

The PE mode high-frequency plasma apparatus 20B shown in FIG. 8 (hereinafter referred to as "plasma treatment apparatus 20 B") is similar in basic configuration to the radio-frequency plasma apparatus 20A in the RIE mode described in FIG. 7 above. In this method, a nozzle plate substrate 30, which is an object to be plasma-treated, is placed on the ground electrode 25 side in a pair of opposing flat plate electrodes, and plasma treatment is performed on the surface of the object to be plasma-treated.

In the present invention, the PE-mode plasma treatment method using argon gas as the reaction gas G is called "Ar-PE-mode plasma treatment", and the PE-mode plasma treatment method using oxygen gas as the reaction gas G is referred to as "$O_2$-PE mode plasma treatment".

(Layer Thickness of Substrate Adhesion Layer)

In the nozzle plate of the present invention, the layer thickness of the substrate adhesion layer is generally in the range of 1 to 5000 nm. Preferably, it is in the range of 1 to 100 mm From the viewpoint of alkali resistance of the nozzle plate and processability during nozzle hole fabrication, it is further preferred to be in the range of 5 to 50 nm.

[Base Layer]

The base layer 4 according to the present invention is formed between the substrate adhesion layer and the liquid-repellent layer and is characterized in that it is a layer containing at least an inorganic oxide or an oxide containing carbon (C).

As inorganic oxides applicable to the formation of the base layer in the present invention, there is no particular limitation, and examples thereof include oxides and composite oxides of metals including transition metals, precious metals, alkali metals, and alkaline earth metals.

More specifically, the inorganic oxide fine particles are preferably an oxide or composite oxide containing one or more metal elements selected from silicon, aluminum, titanium, magnesium, zirconium, antimony, iron, and tungsten.

The oxide or composite oxide may further include one or more selected from phosphorus, boron, cerium, alkali metals, and alkaline earth metals.

Common inorganic oxides include aluminum oxide, silica (silicon dioxide), magnesium oxide, zinc oxide, lead oxide, tin oxide, tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide, niobium oxide, molybdenum oxide, and vanadium oxide.

In the present invention, it is preferred that the inorganic oxide contained in the base layer is a layer composed of silicon dioxide as a major component. The inorganic oxide may also contain organic materials such as organic groups and resins as sub-components.

It is also preferred that the base layer is an organic oxide containing at least carbon (C).

Examples of the organic oxides containing carbon (C) include silicon compounds such as silane, tetramethoxysilane, tetraethoxysilane (TEOS), tetra-n-propoxysilane, tetraisopropoxysilane, tetra-n-butoxysilane, tetra-t-butoxysilane, dimethyldimethoxysilane, dimethyldiethoxysilane, diethyldimethoxysilane, diphenyldimethoxysilane, methyltriethoxysilane, ethyltrimethoxysilane, phenyltriethoxysilane, (3,3,3-trifluoropropoxysilane)trimethoxysilane, hexamethyldisiloxane, bis-(dimethylamino)dimethylsilane, bis-(dimethylamino)methylvinylsilane, bis-(ethylamino) dimethylsilane, N,O-bis-(trimethylsilyl)acetamide, bis-(trimethylsilyl)carbodiimide, diethylamino trimethylsilane, dimethylamino dimethylsilane, hexamethyldisilazane, hexamethylcyclotrisilazane, heptamethyldisilazane, nonamethyltrisilazane, octamethylcyclotetrasilazane, tetrakisdimethylaminosilane, tetraisocyanato silane, and tetramethyldisilazane. Examples of the titanium compound include titanium methoxide, titanium ethoxide, titanium isopropoxide, titanium tetraisopropoxide, titanium n-butoxide, titanium diisopropoxide (bis-2,4-pentanedionate), titanium diisopropoxide (bis-2,4-ethylacetoacetate), titanium di-n-butoxide (bis-2,4-pentanedionate), titanium acetylacetonate, and butyl titanate dimer. Examples of the zirconium compound include zirconium n-propoxide, zirconium n-butoxide, zirconium t-butoxide, zirconium tri-n-butoxide acetylacetonate, zirconium di-n-butoxide bis-acetylacetonate, zirconium acetylacetonate, zirconium acetate, and zirconium hexafluoropentanedionate. Also, examples of the aluminum compound include aluminum ethoxide, aluminum triisopropoxide, aluminum isopropoxide, aluminum n-butoxide, aluminum s-butoxide, aluminium t-butoxide, aluminium acetylacetonate, and triethyldialuminium tri-s-butoxide.

Among the organic oxides containing carbon (C), it is more preferable that the layer containing carbon (C), silicon (Si), and oxygen (O) as main components is formed using a silane compound having a molecular weight of 300 or less (e.g., alkoxysilane, silazane) or a silane coupling agent.

As a base layer for the present invention, it is preferred that the layer is formed using a silane coupling agent, and further it is preferred that the silane coupling agent contained in the base layer has reactive functional groups at both terminals and contains a hydrocarbon chain and a benzene ring in the middle portion.

As a specific configuration of the base layer, for example, as an inorganic oxide applicable to the undercoat layer according to the present invention, it is a preferable embodiment (first base layer) that the base layer forms a high-density polymer film by a dehydration condensation reaction of a silane coupling agent A having reactive functional groups at both terminals and containing a hydrocarbon chain and a benzene ring in a middle portion, and it is another preferable embodiment (second base layer) that the base layer is composed of an oxide composed mainly of an inorganic oxide or an organic oxide containing at least Si.

(Formation of a Base Layer by a Silane Coupling Agent A: First Base Layer)

In the present invention, as the silane coupling agent used to form the base layer by dehydration-condensation reaction, it is preferable to apply a silane coupling agent A having reactive functional groups at both terminals and containing a hydrocarbon chain and a benzene ring in the middle portion.

As the silane coupling agent A applicable to the base layer, there is no particular limitation, and any conventionally known compound satisfying the above requirements may be selected and used as appropriate. However, from the viewpoint of being able to fully demonstrate the intended effect of the present invention, it is preferred to use a compound represented by the following Formula (1) having an alkoxy group, a chlorine atom, an acyloxy group, or an amino group as a reactive functional group at both terminals, and having a structure including a hydrocarbon chain and a benzene ring (a phenylene group) in the middle portion.

(Compound Having a Structure Represented by Formula (1))

$$X_sQ_{3-s}Si(CH_2)_tC_6H_4(CH_2)_uSiR_{3-m}X_m \qquad \text{Formula (1)}$$

In the above Formula (1), Q and R respectively represent a methyl group or an ethyl group. t and u respectively represent a natural number of 1 to 10. s and m respectively represent a natural number of 1 to 3, provided that when s is 1 and m is 1, two Q and R are respectively present, and two Q and R may each have the same or different structures. $C_6H_4$ is a phenylene group. x represents an alkoxy group, a chlorine atom, an acyloxy group, or an amino group.

Examples of the alkoxy group include alkoxy groups having 1 to 12 carbon atoms such as a methoxy group, an ethoxy group, a propoxy group, and a butoxy group, preferably alkoxy groups having 1 to 8 carbon atoms, and more preferably alkoxy groups having 1 to 6 carbon atoms.

Examples of the acyloxy group include a linear or branched acyloxy group having 2 to 19 carbon atoms (acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, octylcarbonyloxy, tetradecylcarbonyloxy, and octadecylcarbonyloxy).

Examples of the amino group include an amino group and substituted amino groups having 1 to 15 carbon atoms (e.g., methylamino, dimethylamino, ethylamino, methylethylamino, diethylamino, n-propylamino, methyl-n-propylamino, ethyl-n-propylamino, n-propylamino, isopropylamino, isopropylmethylamino, isopropylethylamino, diisopropylamino, phenylamino, diphenylamino, methylphenylamino, ethylphenylamino, n-propylphenylamino, and isopropylphenylamino.

Exemplified compounds having a structure represented by Formula (1) according to the present invention are listed below, but the present invention is not limited to these exemplified compounds.

(1) 1,4-Bis(trimethoxysilylethyl)benzene
(2) 1,4-Bis(triethoxysilylethyl)benzene
(3) 1,4-Bis(trimethoxysilylbutyflbenzene
(4) 1,4-Bis(triethoxysilylbutyflbenzene
(5) 1,4-Bis(trimethylaminosilylethyl)benzene
(6) 1,4-Bis(triethylaminosilylethyl)benzene
(7) 1,4-Bis(trimethylaminosilylbutyflbenzene
(7) 1,4-Bis(triacetoxysilylethyl)benzene
(8) 1,4-Bis(trichloromethylsilylethyl)benzene
(9) 1,4-Bis(trichloroethylsilylethyl)benzene The compound having a structure represented by Formula (1) according to the present invention may be obtained by synthesis according to a conventionally known synthesis method or may be obtained as a commercially available product.

<Method for Forming a Base Layer Using a Silane Coupling Agent A>

The base layer according to the present invention is formed by dissolving a silane coupling agent A having reactive functional groups at both terminals and containing a hydrocarbon chain and a benzene ring in the middle portion, in an organic solvent, for example, ethanol, propanol, butanol, or 2,2,2-trifluoroethanol at a desired concentration to prepare a coating liquid for forming the base layer, and then the coating liquid is applied and dried on a substrate by a wet coating method to form a base layer.

Although there is no particular restriction as to the concentration of the silane coupling agent A in the coating liquid for forming the base layer, it is generally in the range of 0.5 to 50 mass %, and preferably in the range of 1.0 to 30 mass %

Although there is no particular limitation on the layer thickness of the first base layer in the present invention, it is preferable that the layer thickness be generally in the range of 1 to 500 nm, and even more preferably in the range of 5 to 200 nm.

(Formation of a Base Layer Composed of an Oxide an Oxide Whose Main Component is an Organic Oxide Containing Si Second Base Layer)

In the base layer of the present invention, it is also preferred that the second base layer is composed of an oxide whose main component is an organic oxide containing Si.

Preferably, as shown in FIG. 4, the base layer is composed of two layers of a first base layer 6 and a second base layer 7 in a base layer unit 4U, wherein the first base layer 6 is composed of a silane coupling agent A having reactive functional groups at both terminals as described above and containing a hydrocarbon chain and a benzene ring in the middle portion, and, the second base layer 7 is composed of an organic oxide containing Si as described below. This is a preferred aspect.

The following are examples of alkoxysilanes, silazanes or silane coupling agents having a molecular weight of 300 or less applicable to the present invention, but the compounds are not limited to these example compounds. The numerical values in parentheses after each compound are molecular weights (Mw).

Examples of the alkoxysilane include tetraethoxysilane ($Si(OC_2H_5)_4$, Mw: 208.3), methyltriethoxysilane ($CH_3Si(OC_2H_5)_3$, Mw: 178.3), methyltrimethoxysilane ($CH_3Si(OCH_3)_3$, Mw: 136.2), dimethyldiethoxysilane ($(CH_3)_2Si(OC_2H_5)_2$, Mw: 148.3), and dimethyldimethoxysilane ($(CH_3)_2Si(OCH_3)_2$, Mw: 120.2).

Examples of the silazane include 1,1,1,3,3,3-hexamethyldisilazane ($(CH_3)_3SiNHSi(CH_3)_3$, 161.4), 1,1,1,3,3,3-hexaethyldisilazane ($(C_2H_5)_3SiNHSi(C_2H_5)_3$, 245.4). Other examples include 1,3-bis(chloromethyl)tetramethyldisilazane and 1,3-divinyl-1,1,3,3-tetramethyldisilazane.

In addition, examples of the silane coupling agent include:

(1) vinyl silane coupling agent: vinyl trimethoxysilane ($CH_2{=}CHSi(OCH_3)_3$, Mw: 148.2), vinyltriethoxysilane ($CH_2{=}CHSi\ (OC_2H_5)_3$, Mw: 190.3), others including $CH_2{=}CHSi(CH_3)(OCH_3)_2$, $CH_2{=}CHCOO(CH_2)_2Si(OCH_3)_3$, $CH_2{=}CHCOO(CH_2)_2Si(CH_3)Cl_2$, $CH_2{=}CHCOO(CH_2)_3SiCl_3$, $CH_2{=}C(CH_3)Si\ (OC_2H_5)_3$ may be mentioned.

(2) Amino silane coupling agent: 3-aminopropyltrimethoxysilane ($H_2NCH_2CH_2CH_2Si(OCH_3)_3$, mW: 179.3), 3-(2-aminoethylamino)propyltrimethoxysilane ($H_2NCH_2CH_2NHCH_2CH_2CH_2Si(OCH_3)_3$, Mw: 222.4), and 3-(2-aminoethylamino)propylmethyldimethoxysilane ($H_2NCH_2CH_2NHCH_2CH_2CH_2Si(CH_3)(OCH_3)_2$, Mw: 206.4) may be mentioned.

(3) Epoxy silane coupling agent: 3-glycidoxypropyltrimethoxysilane (Mw: 236.3) and 3-glycidoxypropyltriethoxysilane (Mw: 278.4) may be mentioned.

<Forming Method of Second Base Layer>

The second base layer according to the present invention is formed by dissolving a silane compound having a molecular weight of 300 or less, such as a conventionally known alkoxysilane, silazane or silane coupling agent, in an organic solvent, such as ethanol, propanol, butanol, or 2,2,2-trifluoroethanol, a desired concentration, to prepare a coating liquid for forming an intermediate layer. The coating liquid is then coated on the base layer by a wet coating method to form the second base layer.

Although there is no particular restriction as to the concentration of the material for forming the inorganic oxide in the coating liquid for forming the second base layer, it is generally in the range of 0.5 to 50 mass %, preferably in the range of 1.0 to 30 mass %.

The layer thickness of the second base layer for the present invention is in the range of 0.5 to 500 nm, preferably in the range of 1 to 300 nm, and more preferably in the range of 5 to 100 nm.

[Liquid-Repellent Layer]

In the present invention, it is preferred that the liquid-repellent layer contains a coupling agent containing fluorine (F) (hereinafter also referred to as coupling agent B).

The coupling agent B containing fluorine (F) applicable to the liquid-repellent layer according to the present invention is not particularly limited, but preferably it contains a fluorine-based compound which is (1) a compound having a perfluoroalkyl group containing at least an alkoxysilyl group, a phosphonic acid group or a hydroxy group, or a compound having a perfluorinated polyether group containing at least an alkoxysilyl group, a phosphonic acid group or a hydroxy group, or (2) a mixture containing a compound having a perfluoroalkyl group or a mixture containing a compound having a perfluorinated polyether group.

Specific examples of the coupling agent B containing fluorine (F) applicable to the liquid-repellent layer of the present invention include chlorodimethyl[3-(2,3,4,5,6-pentafluorophenyl)propyl]silane, pentafluorophenyldimethylchlorosilane, pentafluorophenylethoxydimethylsilane, pentafluorophenylethoxydimethylsilane, trichloro(1H,1H,2H,2H-tridecafluoro-n-octyl)silane, trichloro(1H,1H,2H,2H-heptadecafluorodecypsilane, trimethoxy(3,3,3-trifluoropropyl)silane, triethoxy(1H,1H,2H,2H-nonafluorohexyl)silane, triethoxy-1H,1H,2H,2H-heptadecafluorodecylsilane, trimethoxy (1H,1H,2H,2H-heptadecafluorodecyl) silane, trimethoxy (1H,1H,2H,2H-nonafluorohexyl) silane, trichloro[3-(pentafluorophenyl)propyl]silane, trimethoxy(11-pentafluorophenoxyundecyl)silane, triethoxy [5,5,6,6,7,7,7-heptafluoro-4,4-bis(trifluoromethypheptyl]silane, trimethoxy(pentafluorophenyl)silane, triethoxy(1H,1H,2H,2H-nonafluorohexyl)silane, and γ-glycidylpropyltrimethoxysilane.

Silane coupling agents containing fluorine (F) are also available commercially, for example, they may be obtained from Toray Dow Corning Silicones, Shin-Etsu Chemical, Daikin Industries (e.g., OPTOOL DSX), Asahi Glass (e.g., CYTOP), and SECO Corporation (e.g., Top Clean Safe (registered trademark)), Fluoro technogy Co., Ltd. (e.g., Fluoro Surf), Gelest Inc., and Solvay Sollexis Corporation (e.g., Fluorolink S10). In addition, the compounds described in the following documents may be used: J. Fluorine Chem. 79(1) 87 (1996), Material Technology, 16(5), 209 (1998), Collect. Czech. Chem. Commun. vol. 44, pp. 750-755, J. Chem. pp. 50-755, J. Amer. Chem. Soc. 1990, vol. 112, pp. 2341-2348, Inorg. Chem. Vol. 10, pp. 889-892, 1971, U.S. Pat. No. 3,668,233. They may be produced by the synthetic methods described in JP-A 58-122979, JP-A 7-242675, JP-A 9-61605, JP-A 11-29585, JP-A 2000-64348, and JP-A 2000-144097, or by the synthetic methods similar to these methods.

Specifically, compounds having silane group-terminated perfluorinated polyether groups include, for example, "OPTOOL DSX" manufactured by Daikin Industries, Ltd. as shown above, and compounds having silane group-terminated fluoroalkyl groups include, for example, "FG-5010Z130-0.2" manufactured by Fluoro Surf Inc. Polymers having perfluoroalkyl groups include, for example, "SF Coat Series" manufactured by AGC Seimi Chemical, and polymers having a fluorine-containing heterocyclic structure in the main chain include, for example, "CYTOP" manufactured by the above Asahi Glass Co. The mixture of FEP (tetrafluoroethylene-6-fluoropropylene copolymer) dispersion and polyamide-imide resin may also be mentioned.

As a method of forming the liquid-repellent layer by the PVD method, it is preferable to use, as the fluorine-based compound, Evaporation substances WR1 and WR4 manufactured by Merck Japan Co., Ltd., which are fluoroalkylsilane mixed oxides. It is preferable to form in advance a silicon oxide layer as a base layer, for example, in the case of forming the liquid-repellent layer by WR1 on the silicon substrate. The liquid-repellent layer formed by WR1 and WR4 exhibits liquid repellency with respect to an alcohol such as ethanol, ethylene glycol (including polyethylene glycol), a thinner, and an organic solvent such as paint, in addition to water.

The layer thickness of the liquid-repellent layer in the present invention is generally in the range of 1 to 500 nm, preferably in the range of 1 to 400 nm, and it is more preferred to be in the range of 2 to 200 nm.

[Processing of Nozzle Plate]

The nozzle plate manufacturing method for manufacturing the nozzle plate of the present invention is characterized by the following, as described in detail above.

(1) The nozzle plate is formed by forming at least a base layer and a liquid-repellent layer on a substrate, (2) A substrate adhesion layer is formed between the substrate and the base layer, (3) The substrate adhesion layer is configured to have a higher Cr concentration higher than the substrate, (4) The base layer is formed with an inorganic oxide or an oxide containing carbon (C), and (5) The liquid-repellent layer is formed using a coupling agent containing fluorine (F).

Figure 2:
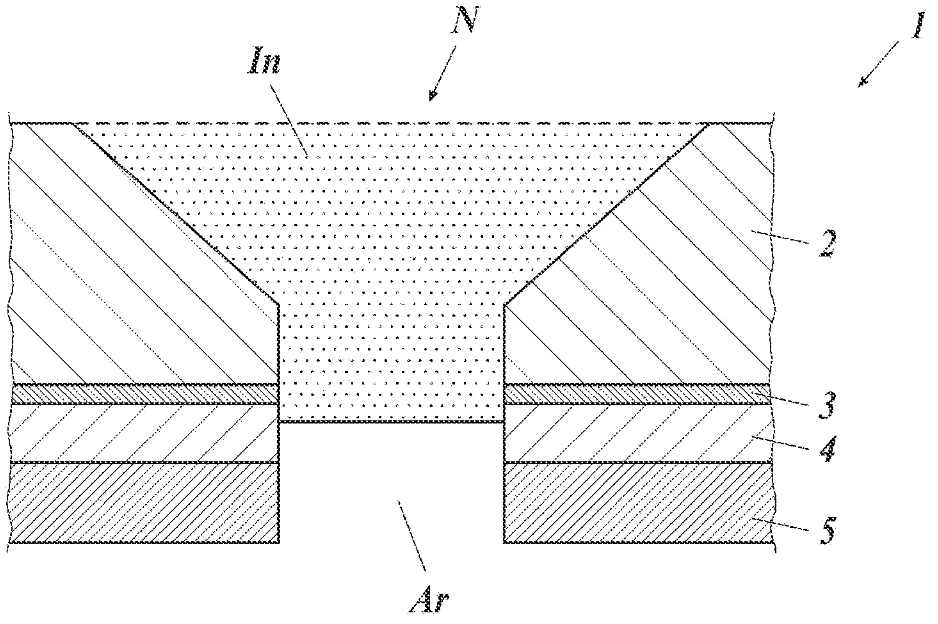
FIG. 2 This is a schematic cross-sectional view showing an example of a configuration of a nozzle hole portion of the nozzle plate of the present invention.

The nozzle plate 1 described in FIG. 2 above is a schematic cross-sectional view showing an example of the configuration of the nozzle hole portion of the nozzle plate of the present invention.

As shown in FIG. 2, a nozzle portion N having a desired shape as an ink discharge portion is formed on the nozzle plate 1.

For the specific methods of forming nozzle holes on the nozzle plate of the present invention, the methods described in the following may be referred to: JP-A 2005-533662, JP-A 2007-152871, JP-A 2007-313701, JP-A 2009-255341, JP-A 2009-274415, JP-A 2009-286036, JP-A 2010-023446, JP-A 2011-011425, JP-A 2013-202886, JP-A 2014-144485, JP-A 2018-083316, and JP-A 2018-111208. The detailed description here is omitted.

As shown in FIG. 2, by forming a substrate adhesion layer 3 with high Cr concentration between the substrate 2 and the base layer 4 in the nozzle plate configuration of the present invention, the interface breakdown caused by the ink liquid is prevented, and the nozzle plate is made to be highly durable.

In the nozzle plate of the present invention, it is preferred that the nozzle holes are formed by laser processing.

In the nozzle plate of the present invention, it is preferable to use a laser in the external processing of the nozzle hole as a manufacturing method thereof, and furthermore, it is preferable that the laser is a pulsed laser or a CW laser.

It is preferable to use a continuous oscillation type laser beam (CW laser beam) or a pulsed oscillation type laser beam (pulsed laser beam) as a laser applicable in the manufacture of the nozzle plate of the present invention.

Examples of the laser beams that may be used here include one or more of gaseous lasers such as Ar, Kr, and excimer lasers, single-crystal YAG, $YVO_4$, Forsterite ($Mg_2SiO_4$), $YAlO_3$, and $GdVO_4$, YLF, or polycrystalline (ceramic) YAG, $Y_2O_3$, $YVO_4$, $YAlO_3$, and $GdVO_4$ in which one or more of the following are added as a dopant: Nd, Yb, Cr, Ti, Ho, Er, Tm, and Ta, glass laser, ruby laser, alexandrite laser, Ti: sapphire laser, copper vapor laser, or gold vapor laser.

Among them, the laser to be preferably used emits ultraviolet laser light having a wave length of about 266 nm, for example, YAG-UV (yttrium-aluminum-garnet crystal: wave length 266 nm) or $YVO_4$ (wave length: 355 nm). In particular, when the object to be processed is an organic material, molecular bonds such as C—H bonds and C—C bonds may be dissociated by thermal action with a laser having a wave length of about 266 nm.

As an example of the irradiation conditions, for example, in the case of YAG-UV (wave length 266 nm), the pulse width is 12 nsec, the power is 1.6 W, and in the case of $YVO_4$ (wave length: 355 nm), the pulse width is 18 nsec and the power is 2.4 W.

In addition, it is possible to use ultrafast lasers that produce intense laser pulses with a duration of approximately $10^{-11}$ seconds (10 psec) to $10^{-14}$ seconds (10 fsec) and short-pulse lasers that produce intense laser pulses with a duration of approximately $10^{-10}$ seconds (100 psec) to $10^{-11}$ seconds. These pulsed lasers are also useful for cutting or drilling a wide variety of materials.

<<Inkjet Head>>

Figure 9:
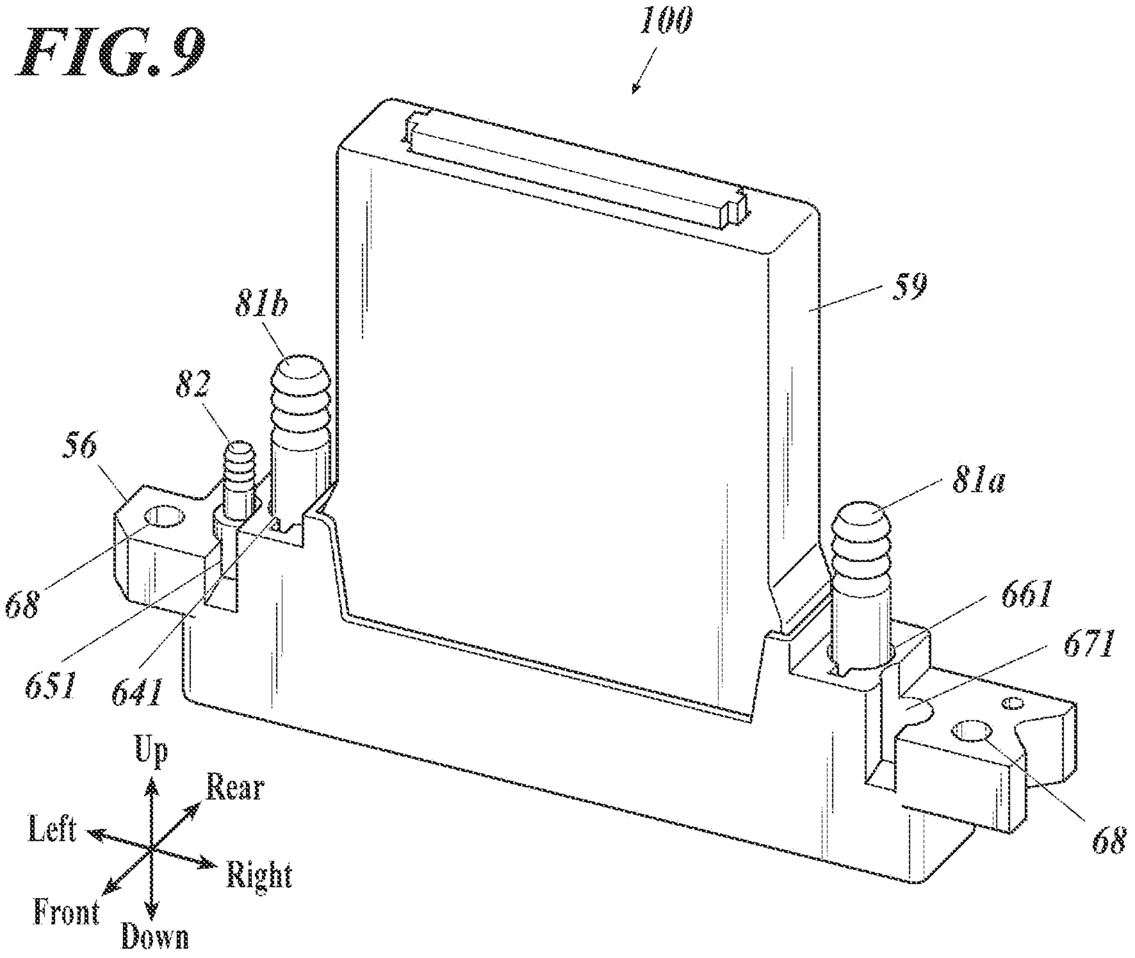
FIG. 9 This is a schematic perspective view showing an example of a structure of an inkjet head to which a nozzle plate of the present invention may be applied.
Figure 10:
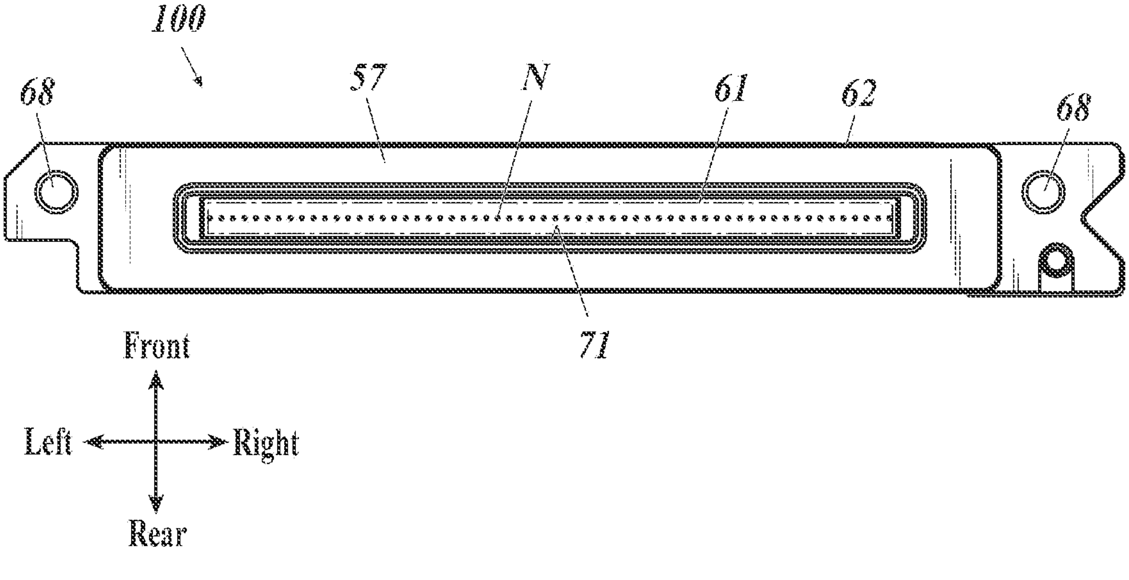
FIG. 10 This is a bottom view showing an example of a nozzle plate constituting the inkjet head shown in FIG. 9.

FIG. 9 is a schematic external view of an example structure of an inkjet head to which the nozzle plate of the present invention may be applied. FIG. 10 is a bottom view of an inkjet head equipped with the nozzle plate of the present invention.

As shown in FIG. 9, the inkjet head 100 equipped with the nozzle plate of the present invention is mounted in an inkjet printer (illustration omitted). The inkjet head 100 is equipped with a head chip that discharges an ink through nozzles, a wiring substrate on which the head chip is arranged, a drive circuit substrate connected to the wiring substrate via a flexible substrate, a manifold that introduces an ink through a filter to a channel of the head chip, a housing 56 in which the manifold is housed, a cap receiving plate mounted to block the bottom opening of the housing 56, a first and a second joints 81*a* and 81*b* attached to first and second ink ports of the manifold, a third joint 82 attached to a third ink port of the manifold, and a cover member 59 attached to the housing 56. Further, mounting holes 68 for mounting the housing 56 to the printer main body side are respectively formed.

In addition, the cap receiving plate 57 shown in FIG. 10 has an outer shape formed in a substantially rectangular plate shape elongated in the left-right direction corresponding to the shape of the cap receiving plate mounting portion 62, and is provided with a nozzle opening portion 71 elongated in the left-right direction in order to expose the nozzle plate 61 in which the plurality of nozzles N are arranged in a substantially central portion of the cap receiving plate 57. With respect to the specific structure of the interior of the inkjet head shown in FIG. 9, reference may be made to, for example, FIG. 2 described in JP-A 2012-140017.

Although FIG. 9 and FIG. 10 show typical examples of inkjet heads, inkjet heads having configurations described in the following may be suitably selected and used: JP-A 2012-140017, JP-A 2013-010227, JP-A 2014-058171, JP-A 2014-097644, JP-A 2015-142979, JP-A 2015-142980, JP-A 2016-002675, JP-A 2016-002682, JP-A 2016-107401, JP-A 2017-109476, and JP-A 2017-177626.

<<Inkjet Ink>>

There are no particular restrictions on the inkjet inks applicable to the inkjet recording method using the inkjet head of the present invention. For example, there are various types of inkjet inks, such as water-based inkjet inks containing water as a main solvent, oil-based inkjet inks containing a non-volatile solvent which does not volatilize at room temperature and substantially no water, organic solvent-based inkjet inks containing a solvent which volatilizes at room temperature and substantially no water, hot-melt inks which are solid at room temperature for printing, and active energy ray curable inkjet inks which are cured by active rays such as ultraviolet rays after printing. However, in the present invention, it is preferable to apply an alkaline ink from the viewpoint of being able to demonstrate the effect of the present invention.

Inks includes, for example, an alkaline ink and an acidic ink, and in particular, the alkaline ink may cause chemical deterioration of the substrate, the liquid-repellent layer, and the nozzle forming surface. However, in the inkjet recording method using such an alkaline ink, it is particularly effective to apply the inkjet head equipped with the nozzle plate of the present invention.

More specifically, the ink applicable to the present invention includes color materials such as dyes and pigments, water, a water-soluble organic solvent, and a pH adjusting agent. Examples of the water-soluble organic solvent which may be used include ethylene glycol, propylene glycol, diethylene glycol, dipropylene glycol, glycerin, triethylene glycol, ethanol, and propanol. Examples of the pH adjusting agent which may be used include sodium hydroxide, potassium hydroxide, sodium acetate, sodium carbonate, sodium bicarbonate, alkanolamine, hydrochloric acid, and acetic acid.

When sodium hydroxide, potassium hydroxide, sodium acetate, sodium carbonate, sodium bicarbonate, or alkanolamine is used as a pH adjusting agent, the ink becomes alkaline and may cause damage (chemical degradation) to the liquid-repellent layer and nozzle formation surface. The alkaline ink has a pH value of 8.0 or higher.

As described above, the liquid-repellent layer is formed from a fluorine-containing silane coupling agent. The liquid-repellent layer has a structure in which a silicon-containing substructure and a fluorine-containing substructure are bonded by a substituent such as a methylene group ($CH_2$). Since the bond energy between carbon (C) and carbon (C) is smaller than the bond energy between silicon (Si) and oxygen (O) and the bond energy between carbon (C) and fluorine (F), the portion where carbon (C) and carbon (C) are bonded has weak bond, compared to the portion where silicon (Si) and oxygen (O) are bonded, and the portion where carbon (C) and fluorine (F) are bonded, and is susceptible to mechanical and chemical damage.

In an inkjet recording method using alkaline ink, which is prone to produce such phenomenon, it is effective to apply a nozzle plate having the configuration specified in the present invention in order to enhance durability.

EXAMPLES

The present invention will be specifically described by means of the following examples, but the invention is not limited thereby. In the examples, "part" or "%" is used to indicate "part by mass" or "mass %" unless otherwise specified. Unless otherwise noted, each operation was performed at room temperature (25° C.).

Example 1

<<Production of Nozzle Plates>>

[Production of Nozzle plate 1]

According to the following method, Nozzle plate 1 composed of: substrate 2/substrate adhesion layer 3/first base layer 6/second base layer 7/liquid-repellent layer 5 shown in FIG. 4 was produced.

(1) Preparation of substrate

As a substrate, a stainless steel substrate (SUS304) (3 cm long, 8 cm wide, 50 μm thick) without surface treatment was used.

(2) Formation of first layer (substrate adhesion layer 1)

<Step 1: Formation of Cr Layer by Sputtering Method>

As a sputtering method, a Cr-only metal layer was formed on the substrate by sputtering in an argon gas atmosphere using Cr as a target. The Cr content in the Cr layer formed by this sputtering method was approximately 100 atm %.

Specifically, a Cr target set in advance was sputtered on an electrode of a DC sputtering deposition apparatus under vacuum conditions with the following conditions.

Target: Cr

DC power density: 1.1 W/$cm^2$

Power: RF power (13.56 MHz), 200 W

Temperature: 2.5° C.

Pressure: 0.3 Pa

Introduced gas: Argon gas

Deposition time: 30 sec

Layer thickness: 20 nm

<Step 2: Etching by Ar-RIE Plasma Mode>

Next, the substrate on which the Cr layer was formed in Step 1 was subjected to Ar-RIE plasma mode etching by the following method. Thus, a substrate adhesion layer 1 was formed.

Using an RIE mode high-frequency plasma apparatus having the configuration described in FIG. 7, Ar plasma treatment was performed on the Cr layer to form the substrate adhesion layer 1 with a layer thickness of 20 nm.

The plasma treatment conditions are as follows.

Plasma treatment apparatus: RIE mode high-frequency plasma apparatus

Reaction gas G: Argon gas

Gas flow rate: 50 sccm

Gas pressure: 10 Pa

High-frequency power: 13.56 MHz

High-frequency power density: 0.10 W/$cm^2$

Voltage between electrodes: 450 W

Treatment time: 3 min

Substrate treatment temperature: 80° C. or less (3) Formation of second layer (first base layer)

(Preparation of a Coating Liquid for Forming a First Base Layer)

<Preparation of Liquid A-1>

Liquid A-1 was prepared by mixing the following constituent materials.

Mixed solution of ethanol and 2,2,2-trifluoroethanol (8:2 by volume): 30 mL

Silane coupling agent a: 1,4-Bis(trimethoxysilylethyl) benzene ($(CH_3O)_3Si(CH_2)_2(C_6H_4)(CH_2)_2Si(OCH_3)_3$): 2 mi.

<Preparation of Liquid A-2>

Mixed solution of ethanol and 2,2,2-trifluoroethanol (8:2 by volume): 19.5 mL

Pure water: 30 mL

Hydrochloric acid (36 volume %): 0.5 mL (Formation of First Base Layer)

While stirring the above prepared Liquid A-1 with an agitator, 5 ml of Liquid A-2 was added dropwise. After stirring for about 1 hour after dropping, this mixed liquid was coated on the substrate adhesion layer by a spin coating method under the condition that the layer thickness of the first base layer after drying was 100 nm. The spin coating was performed at 5000 rpm for 20 seconds. Thereafter, the substrate was dried at room temperature for 1 hour and then baked at 200° C. for 30 minutes.

(4) Formation of third layer (second base layer)

(Preparation of a Coating Liquid for Forming a Second Base Layer)

A coating liquid for forming a second base layer was prepared by mixing the following constituent materials.

Mixed solution of ethanol and 2,2,2-trifluoroethanol (8:2 by volume): 69 mL

Pure water: 30 mL

Silane coupling agent c: 3-aminopropyltriethoxysilane ($(C_2H_5O)_3SiC_3H_6NH_2$), KBE-903, Shin-Etsu Chemical Co.): 1 mL (Formation of Second Base Layer)

The above prepared coating liquid for forming a second base layer (KBE-903 concentration: 1.0 volume %) was applied on the first base layer of the substrate by a spin coating method under the condition that the layer thickness of the second base layer after drying became 20 nm. The spin coating was performed at 3000 rpm for 20 seconds. After that, the substrate was dried at room temperature for 1 hour and then heat-treated at 90° C. and 80% RH for 1 hour.

(5) Formation of fourth Layer (liquid-repellent layer)

(Preparation of a Coating Liquid for Forming a Liquid-Repellent Layer)

A coating liquid for forming a liquid-repellent layer was prepared by mixing the following constituent materials.

Mixed solution of ethanol and 2,2,2-trifluoroethanol (8:2 by volume): 69.8 mL

Pure water: 30 mL

Fluorine-containing coupling agent b: (2-perfluorooctyfl-ethyltrimethoxysilane $(CF_3(CF_2)_7C_2H_4Si(OCH_3)_3)$: 0.2 mL (Formation of a Liquid-Repellent Layer)

A coating liquid for forming a liquid-repellent layer containing 0.2 volume % of the fluorine atom-containing coupling agent b prepared above was applied on the second base layer formed above by a spin coating method under the condition that the layer thickness of the liquid-repellent layer after drying became 10 nm. The spin coating was performed at 1000 rpm for 20 seconds. After that, the substrate was dried at room temperature for 1 hour and then heat-treated at 90° C. and 80% RH for 1 hour to prepare Nozzle plate 1.

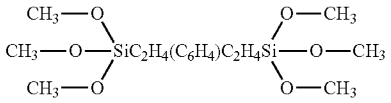

Silane coupling agent a

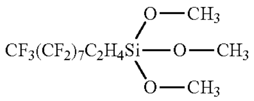

Fluorine-containing coupling agent b $(C_2H_5O)_3SiC_3H_6NH_2$

Silane coupling agent c (6) Measurement of a content rate (atm %) of trivalent Cr with respect to the total Cr content in the substrate adhesion layer The content rate (atm %) of trivalent Cr with respect to the total Cr content as illustrated in FIG. 5 was obtained for the nozzle plate in which the substrate adhesion layer was formed on the substrate by performing Cr sputtering and plasma treatment using X-ray photoelectron spectroscopy.

The specific measurement apparatus used was QUANTERA SXM made by ULVAC-PHI, Inc. The measurement procedure was performed using Monochromatized Al-Kα as the X-ray anode at 25 W output. The detailed analysis method of the measurement data is as described above and will not be described here.

The trivalent Cr content rate in the substrate adhesion layer constituting Nozzle plate 1 measured by the above method was 90 atm %.

(7) Measurement of Cr/Fe of substrate adhesion layer

XPS (X-ray Photoelectron Spectroscopy) was used to measure the energy of photoelectrons generated by X-rays irradiating the surface of a nozzle plate with a substrate adhesion layer formed by Cr sputtering and plasma treatment on the substrate. By measuring the energy of photoelectrons generated, the metal (Cr, Fe) concentrations (atm %), oxygen (O), nitrogen (N), and carbon (C) concentrations (atm %) were analyzed.

The measurement conditions are as follows.

Analyzer: QUANTERA SXM, made by ULVAC-PHI, Inc.

X-ray source: Monochromatized Al-Kα

The Cr content in the surface of the stainless steel substrate measured by the above method was 9.8 atm %. The Cr content of the surface portion of the substrate adhesion layer was 17.6 atm %.

Furthermore, as for Cr/Fe in the substrate adhesion layer constituting Nozzle plate 1, the Cr was almost 100 atm % and almost no Fe was detected. In Table I, it was indicated as "∞".

[Production of Nozzle Plate 2]

Nozzle plate 2 was produced in the same manner as in the production of Nozzle plate 1 except that the high-frequency density condition and the treatment time were appropriately adjusted in the "etching by Ar-RIE plasma mode" of step 2 of the formation process of the substrate adhesion layer, and the content rate of trivalent Cr with respect to the total Cr content of the substrate adhesion layer was changed to 57 atm %.

The Cr content in the surface of the stainless steel substrate measured by the above method was 9.8 atm %. The Cr content of the surface portion of the substrate adhesion layer was 25.3 atm %.

[Production of Nozzle Plate 3]

Nozzle plate 3 was produced in the same manner as in the production of Nozzle plate 1 except that the "etching by Ar-RIE plasma mode" was changed to "$O_2$-RIE plasma mode etching" using $O_2$ gas instead of Ar gas as the reaction gas. The trivalent Cr content rate with respect to the total Cr content of the substrate adhesion layer of Nozzle plate 3 was 44 atm %.

The Cr content of the surface portion of the stainless steel substrate measured by the above method was 9.8 atm %. The Cr content of the surface portion of the substrate adhesion layer was 20.3 atm %.

[Production of Nozzle Plate 4]

Nozzle plate 4 was produced in the same manner as in the production of Nozzle plate 1 except that "formation of the Cr layer by the sputtering method" in Step 1 of the formation process of the substrate adhesion layer was deleted and the formation of "the first base layer" of the second layer and "the second base layer" of the third layer was not performed.

The Cr/Fe of the substrate adhesion layer of the nozzle plate 4 was 0.5. The trivalent Cr content rate to the total Cr content was 41 atm %.

The Cr content of the surface portion of the stainless steel base material measured by the above method was 9.8 atm %. The Cr content in the surface of the substrate adhesion layer was 5.9 atm %.

[Production of Nozzle Plate 5]

Nozzle plate 5 was produced in the same manner as in the production of Nozzle plate 4 except that the PE mode high-frequency plasma apparatus as shown in FIG. 8 was used as a plasma treatment apparatus for forming a substrate adhesion layer instead of the RIE mode high-frequency plasma apparatus as shown in FIGS. 7, and "$O_2$-PE plasma mode etching" was used for forming the substrate adhesion layer.

The Cr/Fe of the substrate adhesion layer of Nozzle plate 5 was 1.0. The trivalent Cr content rate to the total Cr content (atm %) was 35 atm %.

The Cr content of the surface portion of the stainless steel substrate measured by the above method was 9.8 atm %. The Cr content of the surface portion of the substrate adhesion layer was 8.5 atm %.

[Production of Nozzle Plate 6]

Nozzle plate 6 was prepared in the same manner as in the preparation of Nozzle plate 1, except that the substrate adhesion layer was not formed.

<<Evaluation of Nozzle Plates>>

Each of the nozzle plates prepared above was evaluated for ink resistance and abrasion resistance according to the following methods.

[Evaluation of Ink Resistance]

(Formation of Nozzle holes)

A plurality of nozzle holes having the configuration shown in FIG. 1 or 2 and having a diameter of 25 μm were formed in each of the Nozzle plates 1 to 6 produced above using a laser processing machine.

(Preparation of Actual Ink for Evaluation: Disperse Dye Ink)

<Preparation of Dispersion Liquid>

Disperse dye (C.I. Disperse Yellow 160): 24.0 mass %

Diethylene glycol: 30.6 mass %

Styrene-maleic anhydride copolymer (dispersing agent): 12.0 mass %

Ion-exchanged water: 33.4 mass %

The above mixture was dispersed using ceramic beads of 0.5 mm in diameter for 5 hours at 25.00 rpm using a sand grinder manufactured by IMEX Co. The dispersion liquid was dispersed at a rotational speed of 2500 rpm for 5 hours. The dispersion liquid was diluted with water/diethylene glycol=1:4 to prepare Dispersion liquid 1 so that the dye concentration became 5%.

<Preparation of Actual Ink>

The actual ink for evaluation (disperse dye ink) was prepared by adding each composition to the above Dispersion liquid 1, and stirring.

Dispersion liquid 1: 20.0 mass %

Ethylene glycol: 10.0 mass %

Glycerin: 8.0 mass %

EMULGEN 911 (manufactured by Kao Corporation): 0.05 mass %

Ion-exchanged water was added to make it 100 mass %. The liquid properties of the ink prepared by the addition were investigated and confirmed to be alkaline (pH 8.0 or higher).

(Evaluation of Nozzle Plates)

The nozzle plate in which each nozzle hole was formed was immersed in the Actual ink at 65° C. for 40 days.

After immersion treatment, the nozzle plate was washed with pure water and dried, and then observed with a 100× magnification loupe to examine the presence or absence of peeling between the substrate and substrate adhesion layer inside the nozzle holes as shown in FIG. 1 and FIG. 2. The adhesion resistance of the nozzle holes to the Actual ink was evaluated according to the following criteria.

Double circle: No peeling is observed in all of the nozzles

Circle: Extremely weak peeling is observed in less than 5% of the nozzles, but this is not a practical problem.

Triangle: Weak peeling is observed in more than 5% and less than 10% of the nozzles, but this is acceptable for practical use.

Cross mark: Some nozzles have obvious peeling, which is a problem in practical use.

[Evaluation of Abrasion Resistance (Wiping Resistance)]

(Preparation of Black Ink)

A black ink for evaluation having the following composition was prepared.

<Preparation of Black Pigment Dispersion>

C.I. Pigment Black 6: 12.0 mass %

PB822 (Ajinomoto Fine-Techno Co., Inc.): 5.0 mass %

Methyl isopropyl sulfone: 5.0 mass %

Triethylene glycol monobutyl ether: 68.0 mass %

Ethylene glycol diacetate: 10.0 mass %

The above materials were mixed and dispersed in a horizontal bead mill filled with 0.3 mm zirconia beads at 60% by volume to obtain a black pigment dispersion. The average particle diameter was 125 nm.

<Preparation of Black Ink>

Black pigment dispersion: 33.0 mass %

Ion-exchanged water: 2.0 mass %

Ethylene glycol monobutyl ether: 55.0 mass %

Triethylene glycol monomethyl ether acetate: 6.7 mass %

N-methyl-2-pyrrolidone: 3.3 mass %

(Wiping Test)

In a container containing the above prepared black ink at 25° C., each nozzle plate with a plurality of nozzle holes formed by the above method was fixed with the liquid-repellent layer on the top surface using a fixing jig. The wiper blade made of ethylene-propylene-diene rubber was used to wipe the surface of the liquid-repellent layer of the nozzle plate several times, and the abrasion resistance was evaluated according to the following criteria.

Double circle: No peeling of the liquid-repellent layer near the nozzle is observed for all nozzles even after wiping operation of more than 5000 times.

Circle: No peeling of the liquid-repellent layer near the nozzle is observed for all nozzles after wiping operation of less than 5000 times, but extremely weak peeling was observed in less than 5% of the nozzles in the wiping operation of 5000 times or more.

Triangle: The occurrence of peeling of the liquid-repellent layer in the vicinity of the nozzle is not observed in all of the nozzles in the wiping operation performed less than 1000 times, but extremely weak peeling was observed in less than 5% of the nozzles in the wiping operation performed in the range of 1000 to 5000 times.

Cross mark: After 1000 times of wiping operation, it is confirmed that there were nozzles with peeling of the liquid-repellent layer, which is a practical problem.

The evaluation results obtained from the above are shown in Table I.

TABLE I

| | Substrate | | First layer: Substrate adhesion layer | | | | | |
|---|---|---|---|---|---|---|---|---|
| Nozzle plate No. | Constituent material | Cr content (atm %) | Number | Formation of Cr layer | Plasma treatment condition | Cr/Fe | *A (atm %) | Cr content (atm %) |
| 1 | SUS | 9.8 | 1 | Cr sputtering | Ar-RIE plasma mode | ∞ | 90 | 17.6 |

TABLE I-continued

| | | | | | | | | |
|---|---|---|---|---|---|---|---|---|
| 2 | SUS | 9.8 | 2 | Cr sputtering | — | ∞ | 57 | 25.3 |
| 3 | SUS | 9.8 | 3 | Cr sputtering | $O_2$-RIE plasma mode | ∞ | 44 | 20.3 |
| 4 | SUS | 9.8 | 4 | — | $O_2$-RIE plasma mode | 0.5 | 41 | 5.9 |
| 5 | SUS | 9.8 | 5 | — | $O_2$-RIE plasma mode | 1.0 | 35 | 8.5 |
| 6 | SUS | 9.8 | — | — | — | — | — | — |

| Nozzle plate No. | Second layer First base layer | Third layer Second base layer | Fourth layer Liquid-repellent layer | Nozzle hole forming method | Each evaluation result Ink resistance | Abrasion resistance | Remarks |
|---|---|---|---|---|---|---|---|
| 1 | *1 | *2 | *3 | Laser | ◎ | ◎ | Present Invention |
| 2 | *1 | *2 | *3 | Laser | ◎ | ○ | Present Invention |
| 3 | *1 | *2 | *3 | Laser | ◎ | Δ | Present Invention |
| 4 | — | — | *3 | Laser | X | X | Comparative Example |
| 5 | — | — | *3 | Laser | Δ | X | Comparative Example |
| 6 | *1 | *2 | *3 | Laser | Δ | Δ | Comparative Example |

*A: Content of trivalent Cr (atm %) to the total Cr content

Cr content: Cr content at the surface portion of the substrate or substrate adhesion layer

*1: Silane coupling agent a

*2: Silane coupling agent c

*3: Fluorine-containing coupling agent b

As shown in Table I, in the nozzle plate having the constitution defined in the present invention, the base layer acts as a stress relieving layer even in an environment where the nozzle plate is exposed to the alkaline ink components for a long period of time or when the surface is subjected to stress, the bonding property between the respective constituent layers is high, and the nozzle plate of the present invention has excellent ink resistance and abrasion resistance. It was also found that the nozzle plate of the present invention has excellent adhesiveness between the substrate inside the nozzle hole and the substrate adhesion layer even after being immersed in alkaline ink for a long period of time.

Example 2

Nozzle plates 11 to 13 were fabricated in the same manner as in Nozzle plates 1 to 3 in Example 1, except that the materials constituting the first and second base layers were changed from silane coupling agent of an oxide containing carbon to $SiO_2$ as an inorganic oxide, and Nozzle plates 21 to 23 were fabricated in the same manner, except that the materials constituting the first and second base layers were changed from silane coupling agent to $TiO_2$ as an inorganic oxide. As a result of evaluating the ink resistance and abrasion resistance in the same manner as the method described in Example 1, it was confirmed that these nozzle plates were excellent in ink resistance and abrasion resistance as in the result of Example 1.

INDUSTRIAL APPLICABILITY

The nozzle plate of the present invention excels in adhesion between components and in ink resistance and abrasion resistance, and it is suitable for inkjet printers using inks in various fields.

REFERENCE SIGNS LIST

1: Nozzle plate
2: Substrate
3: Substrate adhesion layer
4: Base layer
4U: Base layer unit
5: Liquid-repellent layer
6: First base layer
7: Second base layer
20A: RIE plasma treatment apparatus
20B: PE plasma treatment apparatus
21: Reaction chamber
22: High-frequency power supply
23: Capacitor
24: Flat electrode (power feed electrode)
25: Counter electrode (ground electrode)
26: Ground
27: Gas inlet
28: Gas outlet
30: Nozzle plate substrate
31: Discharge space
32, 33: Power feed line
56: Housing

57: Cap receiver
59: Cover
61: Nozzle plate
62: Cap receiving plate mounting portion
68: Mounting hole
71: Nozzle opening
81*a*: First joint
81*b*: Second joint
82: Third joint
100: Inkjet head
D: Discharge
G: Reaction gas
N: Nozzle
P: Pump

The invention claimed is:

1. A nozzle plate comprising a substrate having thereon at least a base layer and a liquid-repellent layer, wherein a substrate adhesion layer is provided between the substrate and the base layer; a surface portion of the substrate adhesion layer has a higher concentration (atm %) of Cr than a surface portion of the substrate; and the base layer is a layer containing at least an organic oxide containing carbon (C); and the liquid-repellent layer is a layer formed by using a coupling agent containing fluorine (F).

2. The nozzle plate according to claim 1, wherein a content rate of trivalent Cr with respect to a total Cr content in the surface portion of the substrate adhesion layer is 50 atm % or more.

3. The nozzle plate according to claim 1, wherein a ratio (Cr/Fe) of a concentration (atm %) of Cr to Fe is 0.8 or more in a concentration (atm %) ratio of constituent elements in the surface portion of the substrate adhesion layer.

4. The nozzle plate according to claim 1, wherein a layer thickness of the substrate adhesion layer is in a range of 1 to 50 nm.

5. The nozzle plate according to claim 1, wherein the base layer contains an oxide composed of at least carbon (C), silicon (Si), and oxygen (0) as the organic oxide containing carbon (C).

6. The nozzle plate according to claim 1, wherein the base layer contains a silane coupling agent as the organic oxide containing carbon (C).

7. The nozzle plate according to claim 6, wherein the silane coupling agent contained in the base layer has reactive functional groups at both terminals and contains a hydrocarbon chain and a benzene ring in a middle portion.

8. The nozzle plate according to claim 1, wherein the substrate is stainless steel.

9. An inkjet head equipped with the nozzle plate according to claim 1.

10. The nozzle plate according to claim 1, wherein the coupling agent containing fluorine (F) is selected from the group consisting of chlorodimethyl [3-(2, 3, 4, 5, 6-pentafluorophenyl) propyl] silane, pentafluorophenyldimethylchlorosilane, pentafluorophenylethoxydimethylsilane, pentafluorophenylethoxydimethylsilane, trichloro (1H, 1H, 2H, 2H-tridecafluoro-n-octyl) silane, trichloro (1H, 1H, 2H, 2H-heptadecafluorodecypsilane, trimethoxy (3, 3, 3-trifluoropropyl) silane, triethoxy (1H, 1H, 2H, 2H -nonafluorohexyl) silane, triethoxy-1H, 1H, 2H, 2H -heptadecafluorodecylsilane, trimethoxy (1H, 1H, 2H, 2H -heptadecafluorodecyl) silane, trimethoxy (1H, 1H, 2H, 2H -nonafluorohexyl) silane, trichloro [3-(pentafluorophenyl) propyl] silane, trimethoxy (11-pentafluorophenoxyundecyl) silane, triethoxy [5, 5, 6, 6, 7, 7, 7-heptafluoro-4, 4-bis (trifluoromethypheptyl] silane, trimethoxy (pentafluorophenyl) silane, triethoxy (1H, 1H, 2H, 2H-nonafluorohexyl) silane, and y-glycidylpropyltrimethoxysilane.

11. The nozzle plate according to claim 1, further comprising a second base layer between the base layer and the liquid-repellent layer, wherein the second based layer comprises an organic oxide containing silicon (Si).

* * * * *